(12) United States Patent
Kimura

(10) Patent No.: US 12,360,420 B2
(45) Date of Patent: *Jul. 15, 2025

(54) DISPLAY PANEL, DISPLAY DEVICE, INPUT/OUTPUT DEVICE, AND DATA PROCESSING DEVICE

(71) Applicant: SEMICONDUCTOR ENERGY LABORATORY CO., LTD., Atsugi (JP)

(72) Inventor: Hajime Kimura, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,881

(22) Filed: Nov. 8, 2023

(65) Prior Publication Data

US 2024/0184168 A1 Jun. 6, 2024

Related U.S. Application Data

(63) Continuation of application No. 18/108,694, filed on Feb. 13, 2023, which is a continuation of application (Continued)

(30) Foreign Application Priority Data

Feb. 21, 2017 (JP) .................................. 2017-029967

(51) Int. Cl.
*G02F 1/1343* (2006.01)
*G02F 1/1333* (2006.01)
(Continued)

(52) U.S. Cl.
CPC ...... *G02F 1/1343* (2013.01); *G02F 1/133345* (2013.01); *G02F 1/13338* (2013.01);
(Continued)

(58) Field of Classification Search
CPC ........... G02F 1/133345; G02F 1/13338; G02F 1/136286; G02F 1/134309;
(Continued)

(56) References Cited

U.S. PATENT DOCUMENTS 6,768,531 B2 7/2004 Ochiai et al.
6,995,818 B2 2/2006 Ochiai et al.
(Continued)

FOREIGN PATENT DOCUMENTS

CN 202929599 U 5/2013
EP 1335240 A 8/2003
(Continued)

*Primary Examiner* — Douglas Wilson
(74) *Attorney, Agent, or Firm* — Fish & Richardson P.C.

(57) ABSTRACT

A novel display panel that is highly convenient or reliable is provided. The display panel includes a first pixel, a second pixel, and a functional layer. The first pixel includes a first display element, and the second pixel includes a second display element. The functional layer includes a first pixel circuit and a second pixel circuit. The first display element includes a first electrode, a second electrode, and a layer containing a liquid crystal material. A first distance is provided between the first electrode and the functional layer. A second distance is provided between the second electrode and the functional layer. The first electrode and the second electrode each include a region overlapping with the layer containing a liquid crystal material. The second distance is shorter than the first distance. The second display element includes a third electrode, a fourth electrode, and the layer containing a liquid crystal material. A third distance is provided between the third electrode and the functional layer. A fourth distance is provided between the fourth electrode and the functional layer. The fourth distance is shorter than the third distance and longer than the first distance.

12 Claims, 22 Drawing Sheets

Related U.S. Application Data

No. 17/744,844, filed on May 16, 2022, now Pat. No. 11,640,086, which is a continuation of application No. 15/896,722, filed on Feb. 14, 2018, now Pat. No. 11,353,754.

(51) Int. Cl.
  *G02F 1/1362* (2006.01)
  *G06F 3/041* (2006.01)
  *G09G 3/36* (2006.01)

(52) U.S. Cl.
  CPC ...... *G02F 1/136286* (2013.01); *G06F 3/0412* (2013.01); *G09G 3/36* (2013.01); *G09G 3/3648* (2013.01); *G02F 1/134309* (2013.01); *G02F 1/134318* (2021.01); *G02F 1/134363* (2013.01); *G02F 1/134372* (2021.01); *G09G 2300/0439* (2013.01); *G09G 2310/04* (2013.01); *G09G 2320/0626* (2013.01); *G09G 2320/0666* (2013.01); *G09G 2340/0435* (2013.01); *G09G 2360/144* (2013.01)

(58) Field of Classification Search
  CPC ......... G02F 1/134318; G02F 1/134363; G02F 1/134372; G06F 3/0412; G09G 3/36; G09G 3/3648; G09G 2300/0439; G09G 2310/04; G09G 2320/0626; G09G 2320/0666; G09G 2340/0435; G09G 2360/144
  See application file for complete search history.

(56) References Cited

U.S. PATENT DOCUMENTS

| | | | |
|---|---|---|---|
| 7,209,206 B2 | 4/2007 | Ochiai et al. | |
| 7,499,115 B2 | 3/2009 | Kumagawa et al. | |
| 7,773,182 B2 | 8/2010 | Kimura et al. | |
| 7,847,904 B2 | 12/2010 | Kimura | |
| 7,880,848 B2 | 2/2011 | Kimura et al. | |
| 8,164,729 B2 | 4/2012 | Kimura et al. | |
| 8,427,594 B2 * | 4/2013 | Kim ................. | G02F 1/134309 349/151 |
| 8,502,940 B2 | 8/2013 | Tanaka et al. | |
| 8,537,318 B2 | 9/2013 | Kimura | |
| 8,610,862 B2 | 12/2013 | Kimura | |
| 8,619,227 B2 | 12/2013 | Kimura et al. | |
| 8,816,350 B2 * | 8/2014 | Sugihara ........... | G02F 1/136286 257/71 |
| 8,891,044 B2 | 11/2014 | Hirota et al. | |
| 9,235,090 B2 | 1/2016 | Kimura et al. | |
| 9,316,881 B2 | 4/2016 | Kimura et al. | |
| 9,626,918 B2 | 4/2017 | Hirota et al. | |
| 9,785,021 B2 | 10/2017 | Matsushima et al. | |
| 9,823,526 B2 | 11/2017 | Kimura et al. | |
| 9,904,127 B2 | 2/2018 | Kimura et al. | |
| 10,054,830 B2 | 8/2018 | Kimura et al. | |
| 10,061,168 B2 | 8/2018 | Matsushima et al. | |
| 10,095,070 B2 | 10/2018 | Kimura | |
| 10,324,347 B1 | 6/2019 | Kumagawa et al. | |
| 10,539,847 B2 | 1/2020 | Kimura et al. | |
| 10,551,664 B2 | 2/2020 | Hirota et al. | |
| 10,935,834 B2 | 3/2021 | Hirota et al. | |
| 11,048,135 B2 | 6/2021 | Kimura et al. | |
| 11,126,053 B2 | 9/2021 | Kimura et al. | |
| 11,347,100 B2 | 5/2022 | Hirota et al. | |
| 11,592,719 B2 | 2/2023 | Kimura et al. | |
| 11,650,450 B2 | 5/2023 | Hirota et al. | |
| 2002/0008815 A1 | 1/2002 | Hanakawa et al. | |
| 2007/0229748 A1 * | 10/2007 | Fujita ................ | G02F 1/134363 349/141 |
| 2009/0174828 A1 | 7/2009 | Kumagawa et al. | |
| 2010/0026659 A1 | 2/2010 | Long et al. | |
| 2010/0182273 A1 | 7/2010 | Noguchi et al. | |
| 2010/0194697 A1 | 8/2010 | Hotelling et al. | |
| 2010/0289765 A1 | 11/2010 | Noguchi et al. | |
| 2010/0296015 A1 * | 11/2010 | Kim ................... | G02F 1/134309 349/48 |
| 2013/0127698 A1 * | 5/2013 | Chang ............... | G02F 1/134309 345/100 |
| 2014/0152616 A1 | 6/2014 | Kida et al. | |
| 2015/0301422 A1 | 10/2015 | Miyake et al. | |
| 2016/0004127 A1 | 1/2016 | Qu et al. | |
| 2016/0055807 A1 | 2/2016 | Lee et al. | |
| 2016/0282990 A1 | 9/2016 | Kimura et al. | |
| 2016/0299381 A1 | 10/2016 | Lu et al. | |
| 2016/0299601 A1 | 10/2016 | Yamazaki et al. | |
| 2016/0370676 A1 | 12/2016 | Ono | |
| 2017/0131600 A1 * | 5/2017 | Matsushima ..... | G02F 1/134309 |
| 2017/0153747 A1 | 6/2017 | Yoon et al. | |
| 2017/0242305 A1 | 8/2017 | Liao | |
| 2019/0033639 A1 | 1/2019 | Kimura | |
| 2021/0124450 A1 | 4/2021 | Katsuta et al. | |
| 2023/0205028 A1 | 6/2023 | Kimura et al. | |

FOREIGN PATENT DOCUMENTS

| | | |
|---|---|---|
| EP | 1600930 A | 11/2005 |
| EP | 1793266 A | 6/2007 |
| EP | 2270583 A | 1/2011 |
| EP | 3229066 A | 10/2017 |
| JP | 11-305248 A | 11/1999 |
| JP | 2000-056324 A | 2/2000 |
| JP | 2001-215527 A | 8/2001 |
| JP | 2002-202736 A | 7/2002 |
| JP | 2003-114445 A | 4/2003 |
| JP | 2003-207795 A | 7/2003 |
| JP | 2007-183583 A | 7/2007 |
| JP | 2008-009425 A | 1/2008 |
| JP | 2008-096549 A | 4/2008 |
| JP | 2009-109820 A | 5/2009 |
| JP | 2009-244958 A | 10/2009 |
| JP | 2010-102009 A | 5/2010 |
| JP | 2010-152348 A | 7/2010 |
| JP | 2011-197685 A | 10/2011 |
| JP | 2016-027381 A | 2/2016 |
| JP | 2017-003976 A | 1/2017 |

* cited by examiner

DISPLAY PANEL, DISPLAY DEVICE, INPUT/OUTPUT DEVICE, AND DATA PROCESSING DEVICE

CROSS-REFERENCE TO RELATED APPLICATIONS

This application is a continuation of U.S. application Ser. No. 18/108,694, filed Feb. 13, 2023, now allowed, which is a continuation of U.S. application Ser. No. 17/744,844, filed May 16, 2022, now U.S. Pat. No. 11,640,086, which is a continuation of U.S. application Ser. No. 15/896,722, filed Feb. 14, 2018, now U.S. Pat. No. 11,353,754, which claims the benefit of a foreign priority application filed in Japan as Serial No. 2017-029967 on Feb. 21, 2017, all of which are incorporated by reference.

BACKGROUND OF THE INVENTION

1. Field of the Invention

One embodiment of the present invention relates to a display panel, a display device, an input/output device, and a data processing device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

Touch sensing circuits in which circuit elements, such as touch signal lines (e.g., drive lines and sense lines) and grounding regions, in stacked display pixels are grouped together, and which sense a touch on or near the display are known (Patent Document 1).

A technique in which a common electrode that is for display and arranged for each liquid crystal display element is also used as one electrode (drive electrode) of a pair of touch sensor electrodes, and the other electrode (detection electrode for a sensor) is newly formed is known (Patent Document 2).

REFERENCES

Patent Documents

[Patent Document 1] Japanese Published Patent Application No. 2011-197685
[Patent Document 2] Japanese Published Patent Application No. 2009-244958

SUMMARY OF THE INVENTION

An object of one embodiment of the present invention is to provide a novel display panel that is highly convenient or reliable. Another object of one embodiment of the present invention is to provide a novel display device that is highly convenient or reliable. Another object is to provide a novel input/output device that is highly convenient or reliable. Another object is to provide a novel data processing device that is highly convenient or reliable. Another object is to provide a novel display panel, a novel display device, a novel input/output device, a novel data processing device, or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

(1) One embodiment of the present invention is a display panel including a first pixel, a second pixel, and a functional layer.

The first pixel includes a first pixel circuit and a first display element, and the second pixel includes a second pixel circuit and a second display element.

The functional layer includes a region overlapping with the first display element, a region overlapping with the second display element, the first pixel circuit, and the second pixel circuit.

The first display element includes a first electrode, a second electrode, and a layer containing a liquid crystal material. A first distance is provided between the first electrode and the functional layer. The first electrode includes a region overlapping with the layer containing a liquid crystal material and has a comb-like shape.

A second distance is provided between the second electrode and the functional layer. The second electrode includes a region overlapping with the layer containing a liquid crystal material. The second electrode includes a region overlapping with a space between teeth of the comb-like shape of the first electrode. The second distance is shorter than the first distance.

The second display element includes a third electrode, a fourth electrode, and the layer containing a liquid crystal material. A third distance is provided between the third electrode and the functional layer. The third electrode includes a region overlapping with the layer containing a liquid crystal material and has a comb-like shape.

A fourth distance is provided between the fourth electrode and the functional layer. The fourth electrode includes a region overlapping with the layer containing a liquid crystal material and includes a region overlapping with a space between teeth of the comb-like shape of the third electrode. The fourth distance is shorter than the third distance.

The third distance is longer than the first distance.

(2) One embodiment of the present invention is the above display panel in which the first pixel circuit is electrically connected to the first electrode.

Thus, for example, on the basis of image data, a potential of the first electrode can be controlled. Furthermore, a predetermined electric field can be generated between the first electrode and the second electrode. Furthermore, the orientation of a liquid crystal included in the layer containing a liquid crystal material can be controlled. Consequently, a novel display panel that is highly convenient or reliable can be provided.

(3) One embodiment of the present invention is the above display panel in which the second pixel circuit is electrically connected to the fourth electrode.

Thus, for example, on the basis of image data, a potential of the fourth electrode can be controlled. Furthermore, a predetermined electric field can be generated between the third electrode and the fourth electrode. Furthermore, the orientation of the liquid crystal included in the layer containing a liquid crystal material can be controlled. Consequently, a novel display panel that is highly convenient or reliable can be provided.

(4) One embodiment of the present invention is the above display panel in which the fourth distance is equal to the first distance.

Thus, for example, on the basis of image data, a potential of the first electrode or the fourth potential can be controlled. Furthermore, a predetermined electric field can be generated between the first electrode and the second electrode or between the third electrode and the fourth electrode. Furthermore, the orientation of the liquid crystal included in the layer containing a liquid crystal material can be controlled. Consequently, a novel display panel that is highly convenient or reliable can be provided.

(5) One embodiment of the present invention is the above display panel in which the fourth distance is equal to the second distance and the first pixel circuit is electrically connected to the second electrode.

Thus, for example, on the basis of image data, a potential of the second electrode can be controlled. Furthermore, a predetermined electric field can be generated between the first electrode and the second electrode. Furthermore, the orientation of the liquid crystal included in the layer containing a liquid crystal material can be controlled. Consequently, a novel display panel that is highly convenient or reliable can be provided.

(6) One embodiment of the present invention is the above display panel in which the fourth distance is equal to the second distance and the second pixel circuit is electrically connected to the fourth electrode.

Thus, for example, on the basis of image data, a potential of the fourth electrode can be controlled. Furthermore, a predetermined electric field can be generated between the third electrode and the fourth electrode. Furthermore, the orientation of the liquid crystal included in the layer containing a liquid crystal material can be controlled. Consequently, a novel display panel that is highly convenient or reliable can be provided.

(7) One embodiment of the present invention is a display panel including a first pixel, a second pixel, and a functional layer.

The first pixel includes a first pixel circuit and a first display element, and the second pixel includes a second pixel circuit and a second display element.

The functional layer includes a region overlapping with the first display element, includes a region overlapping with the second display element, includes the first pixel circuit, and includes the second pixel circuit.

The first display element includes a first electrode, a second electrode, and a layer containing a liquid crystal material. A first distance is provided between the first electrode and the functional layer. The first electrode includes a region overlapping with the layer containing a liquid crystal material and has a comb-like shape.

A second distance is provided between the second electrode and the functional layer. The second electrode includes a region overlapping with the layer containing a liquid crystal material. The second electrode includes a region overlapping with a space between teeth of the comb-like shape of the first electrode. The second distance is shorter than the first distance.

The second display element includes a third electrode, a fourth electrode, and the layer containing a liquid crystal material. A third distance is provided between the third electrode and the functional layer. The third electrode includes a region overlapping with the layer containing a liquid crystal material and has a comb-like shape.

A fourth distance is provided between the fourth electrode and the functional layer. The fourth electrode includes a region overlapping with the layer containing a liquid crystal material and includes a region overlapping with a space between teeth of the comb-like shape of the third electrode. The fourth distance is shorter than the third distance.

The third distance is equal to the first distance.

(8) One embodiment of the present invention is the above display panel in which the first pixel circuit is electrically connected to the first electrode.

Thus, for example, on the basis of image data, a potential of the first electrode can be controlled. Furthermore, a predetermined electric field can be generated between the first electrode and the second electrode. Furthermore, the orientation of the liquid crystal included in the layer containing a liquid crystal material can be controlled. Consequently, a novel display panel that is highly convenient or reliable can be provided.

(9) One embodiment of the present invention is the above display panel in which the second pixel circuit is electrically connected to the third electrode.

Thus, for example, on the basis of image data, a potential of the third electrode can be controlled. Furthermore, a predetermined electric field can be generated between the third electrode and the fourth electrode. Furthermore, the orientation of the liquid crystal included in the layer containing a liquid crystal material can be controlled. Consequently, a novel display panel that is highly convenient or reliable can be provided.

(10) One embodiment of the present invention is a display panel including a first pixel, a second pixel, a functional layer, and an insulating film. The first pixel includes a first pixel circuit and a first display element, and the second pixel includes a second pixel circuit and a second display element.

The functional layer includes a region overlapping with the first display element, includes a region overlapping with the second display element, includes the first pixel circuit, and includes the second pixel circuit.

The first display element includes a first electrode, a second electrode, and a layer containing a liquid crystal material. A first distance is provided between the first electrode and the functional layer. The first electrode includes a region overlapping with the layer containing a liquid crystal material and has a comb-like shape.

A second distance is provided between the second electrode and the functional layer. The second electrode includes a region overlapping with the layer containing a liquid crystal material. The second electrode includes a region overlapping with a space between teeth of the comb-like shape of the first electrode. The second distance is shorter than the first distance.

The second display element includes a third electrode, a fourth electrode, and the layer containing a liquid crystal material. A third distance is provided between the third electrode and the functional layer. The third electrode includes a region overlapping with the layer containing a liquid crystal material and has a comb-like shape.

A fourth distance is provided between the fourth electrode and the functional layer. The fourth electrode includes a region overlapping with the layer containing a liquid crystal material, includes a region overlapping with a space between teeth of the comb-like shape of the third electrode, and includes a region overlapping with the second electrode. The fourth distance is shorter than the third distance.

The insulating film includes a region sandwiched between the second electrode and the fourth electrode.

Thus, for example, on the basis of image data, a predetermined electric field can be generated between the first electrode and the second electrode or between the third electrode and the fourth electrode. Furthermore, the orientation of the liquid crystal included in the layer containing a liquid crystal material can be controlled. Consequently, a novel display panel that is highly convenient or reliable can be provided.

(11) One embodiment of the present invention is the above display panel including a display region.

The display region includes one group of pixels, another group of pixels, a scan line, and a signal line. The one group of pixels include the first pixel or the second pixel and are arranged in a row direction.

The another group of pixels include the first pixel and the second pixel and are provided in a column direction that intersects the row direction.

The scan line is electrically connected to the one group of pixels, and the signal line is electrically connected to the another group of pixels.

Thus, image data can be supplied to a plurality of pixels. Furthermore, on the basis of the image data, a plurality of display elements can be driven. Furthermore, image data can be displayed using the display region. Consequently, a novel display panel that is highly convenient or reliable can be provided

(12) One embodiment of the present invention is a display device including the above display panel and a control portion.

The control portion has a function of receiving image data and control data, a function of generating first data on the basis of the image data, and a function of supplying the first data.

The display panel has a function of receiving the first data and a function of displaying an image on the basis of the first data.

Thus, image data can be displayed using the display panel. Consequently, a novel display device that is highly convenient or reliable can be provided.

(13) One embodiment of the present invention is an input/output device including an input portion and a display portion.

The display portion includes the above display panel.

The input portion includes a sensing region and has a function of sensing an object approaching the sensing region. The sensing region includes a region overlapping with the pixel.

(14) One embodiment of the present invention is the above input/output device in which the sensing region includes a control line, a sensing signal line, and a sensing element.

The control line has a function of supplying a control signal and a function of receiving a sensing signal.

The sensing element is electrically connected to the control line and the sensing signal line. The sensing element has a function of supplying the sensing signal that varies in accordance with the control signal and a distance between a region of the sensing region that overlaps with the pixel and an object approaching the region. The sensing element includes a control electrode and a sensing electrode.

The control electrode is electrically connected to the control line and includes the first electrode or the second electrode that is not electrically connected to the first pixel circuit.

The sensing electrode is electrically connected to the sensing signal line and includes the third electrode or the fourth electrode that is not electrically connected to the second pixel circuit.

The sensing electrode is located such that an electric field is generated between the sensing electrode and the control electrode, and part of the electric field is blocked by an object approaching the region overlapping with the pixel.

With such a structure, an object approaching the region overlapping with the display portion can be sensed while image data is displayed by the display portion. Furthermore, a finger or the like that approaches the display portion can be used as a pointer to input positional data. Furthermore, positional data can be associated with image data displayed on the display portion. Consequently, a novel input/output device that is highly convenient or reliable can be provided.

(15) One embodiment of the present invention is a data processing device including at least one of a key board, a hardware button, a pointing device, a touch sensor, an illuminance sensor, an imaging device, an audio input device, an eye-gaze input device, and an attitude sensing device, and the above display panel.

Thus, an arithmetic device can generate image data or control data on the basis of data supplied using a variety of input devices. Consequently, a novel data processing device that is highly convenient or reliable can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of a transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, connection means not only direct connection but also indirect connection through a circuit element such as a wiring, a resistor, a diode, or a transistor so that current, a potential, or voltage can be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Furthermore, in this specification, one of a first electrode and a second electrode of a transistor refers to a source electrode and the other refers to a drain electrode.

According to one embodiment of the present invention, a novel display panel that is highly convenient or reliable can be provided. A novel display device that is highly convenient or reliable can be provided. A novel input/output device that is highly convenient or reliable can be provided. A novel data processing device that is highly convenient or reliable can be provided. A novel display panel, a novel display device, a novel input/output device, a novel data processing device, or a novel semiconductor device can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 12A, 12B1, 12B2, and 12B3 are block diagrams illustrating a structure of a display panel of an embodiment.

DETAILED DESCRIPTION OF THE INVENTION

Figure 1A:
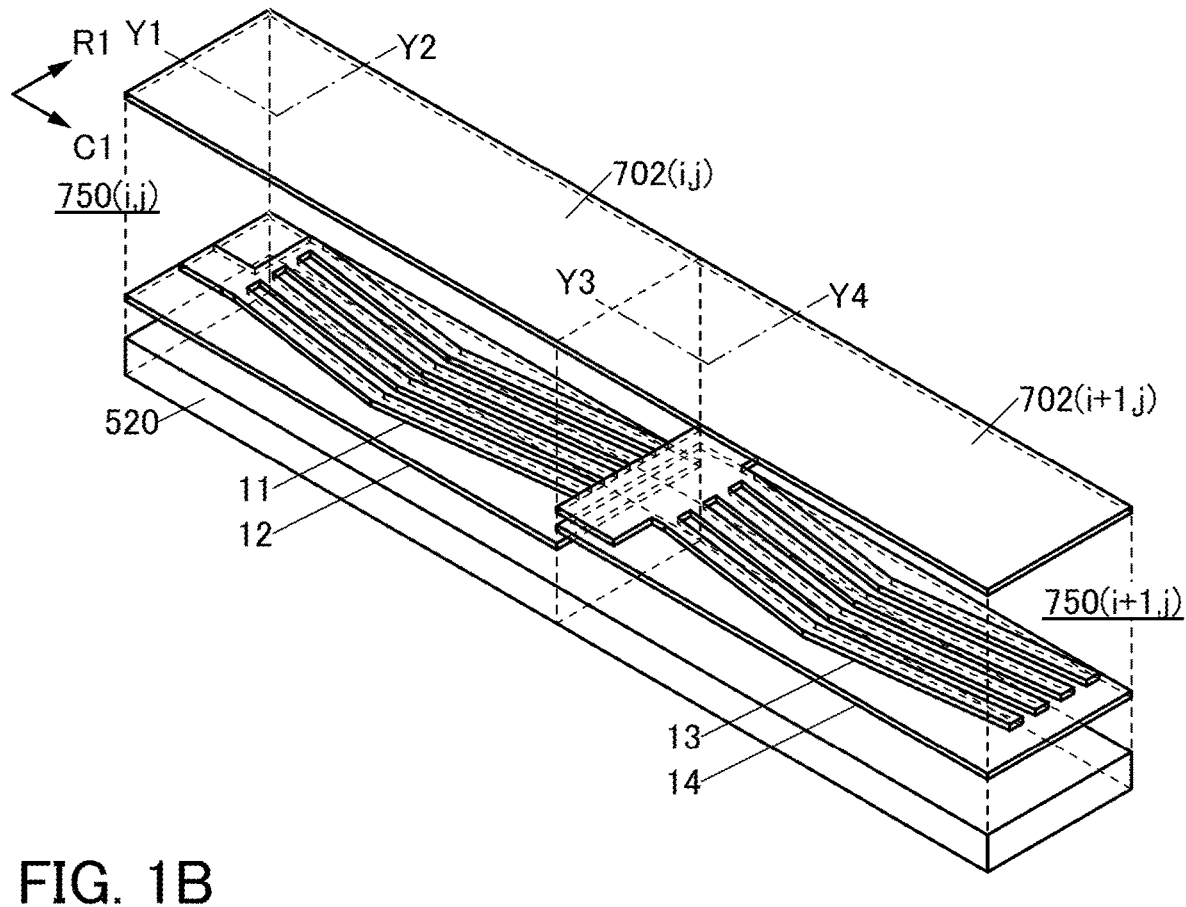
FIGS. 1A and 1B illustrate a structure of a pixel of a display panel of an embodiment.

A display panel of one embodiment of the present invention includes a first pixel, a second pixel, and a functional layer. The first pixel includes a first pixel circuit and a first display element, and a second pixel includes a second pixel circuit and a second display element. The functional layer includes a region overlapping with the first display element, a region overlapping with the second display element, the first pixel circuit, and the second pixel circuit.

The first display element includes a first electrode, a second electrode, and a layer containing a liquid crystal material. A first distance is provided between the first electrode and the functional layer. The first electrode includes a region overlapping with the layer containing a liquid crystal material and has a comb-like shape. A second distance is provided between the second electrode and the functional layer. The second electrode includes a region overlapping with the layer containing a liquid crystal material and includes a region overlapping with a space between teeth of the comb-like shape of the first electrode. The second distance is shorter than the first distance.

The second display element includes a third electrode, a fourth electrode, and the layer containing a liquid crystal material. A third distance is provided between the third electrode and the functional layer. The third electrode includes a region overlapping with the layer containing a liquid crystal material and has a comb-like shape. A fourth distance is provided between the fourth electrode and the functional layer. The fourth electrode includes a region overlapping with the layer containing a liquid crystal material and includes a region overlapping with a space between teeth of the comb-like shape of the third electrode. The fourth distance is shorter than the third distance and longer than the first distance.

Thus, for example, on the basis of image data, a potential of the first electrode can be controlled. Furthermore, a predetermined electric field can be generated between the first electrode and the second electrode. Furthermore, the orientation of a liquid crystal included in the layer containing a liquid crystal material can be controlled. Consequently, a novel display panel that is highly convenient or reliable can be provided.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments. Note that in structures of the present invention described below; the same portions or portions having similar functions are denoted by the same reference numerals in different drawings, and a description thereof is not repeated.

Embodiment 1

In this embodiment, structures of a display panel of one embodiment of the present invention are described with reference to FIGS. 1A and 1B, FIGS. 2A to 2C, FIG. 3, FIGS. 4A to 4C, FIGS. 5A to 5C, FIGS. 6A and 6B, FIGS. 7A and 7B, FIG. 8, FIG. 9, FIGS. 21A to 21C, and FIGS. 22A to 22C.

Figure 1B:
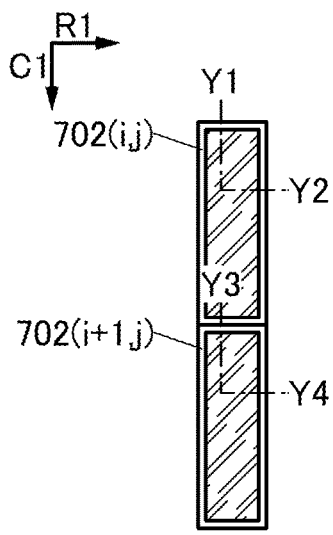

FIGS. 1A and 1B illustrate a structure of the display panel of one embodiment of the present invention. FIG. 1A is an exploded view of part of the display panel of one embodiment of the present invention, and FIG. 1B is a top view of the part of the display panel of one embodiment of the present invention.

Figure 2A:
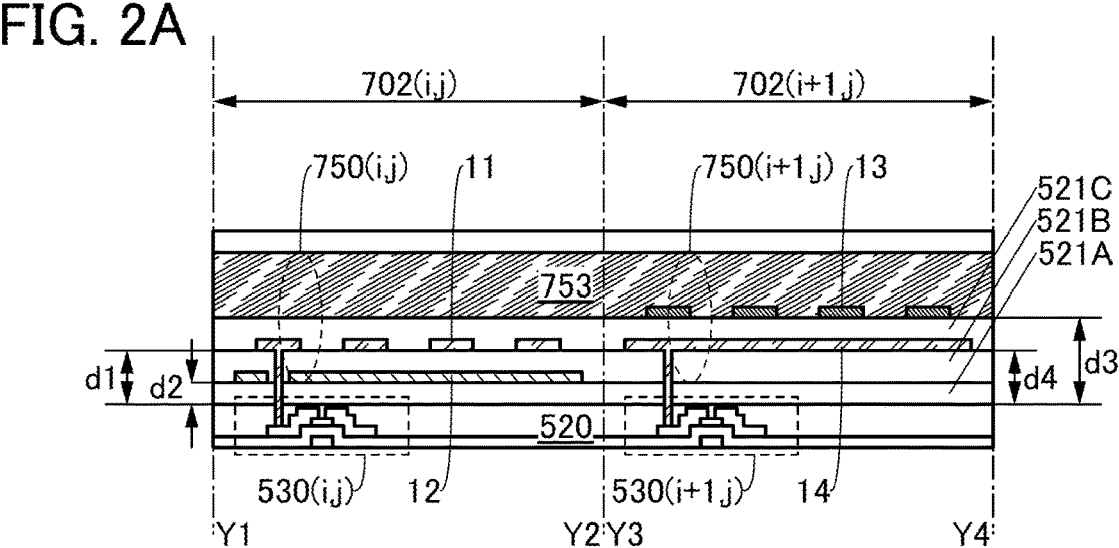
FIGS. 2A to 2C are cross-sectional views each illustrating a structure of a pixel of a display panel of an embodiment.
Figure 2B:
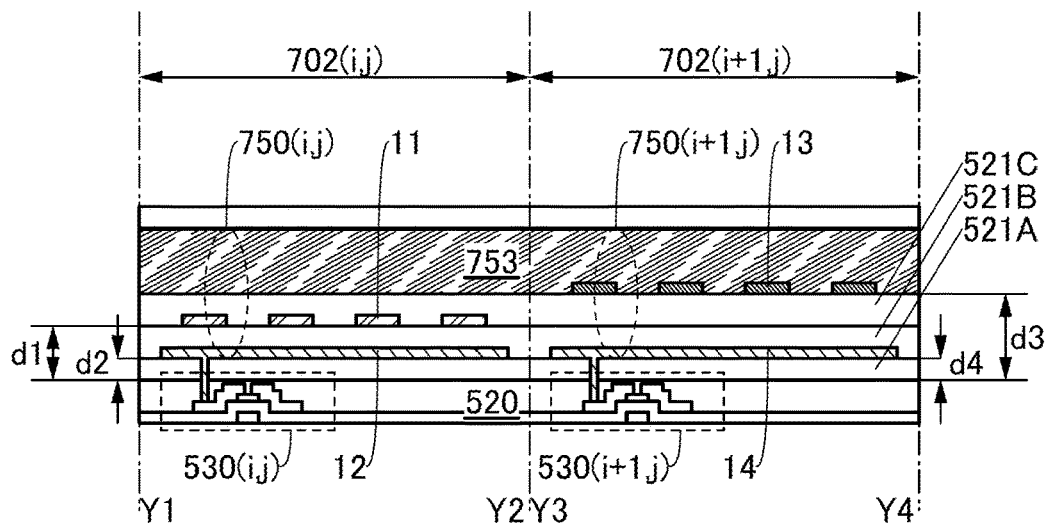
Figure 2C:
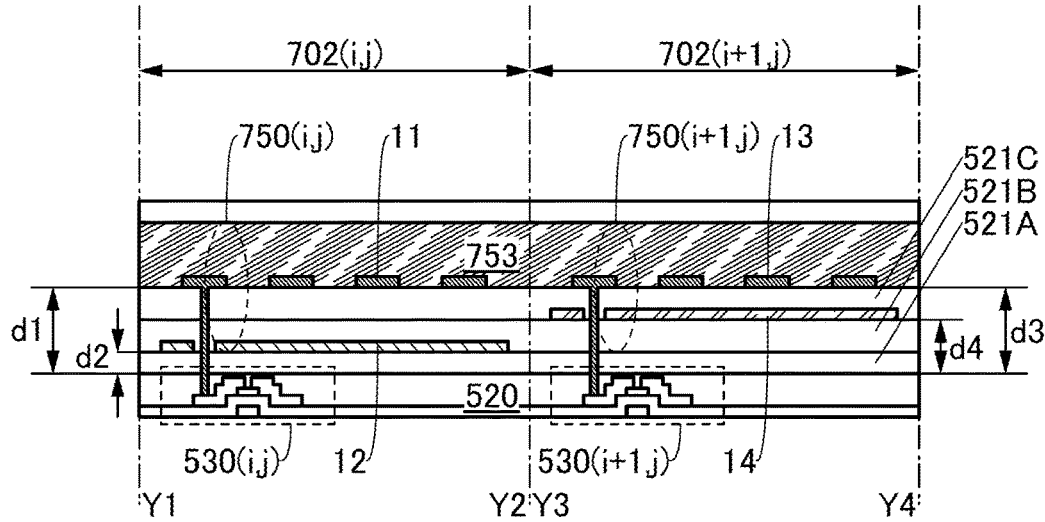

FIGS. 2A to 2C each illustrate a structure of the display panel of one embodiment of the present invention. FIG. 2A is a cross-sectional view taken along the cutting line Y1-Y2 and the cutting line Y3-Y4 in FIG. 1B. FIG. 2B is a cross-sectional view illustrating a structure of the display panel that is different from the structure shown in FIG. 2A, and FIG. 2C is a cross-sectional view illustrating a structure of the display panel that is different from the structures shown in FIGS. 2A and 2B.

Figure 3:
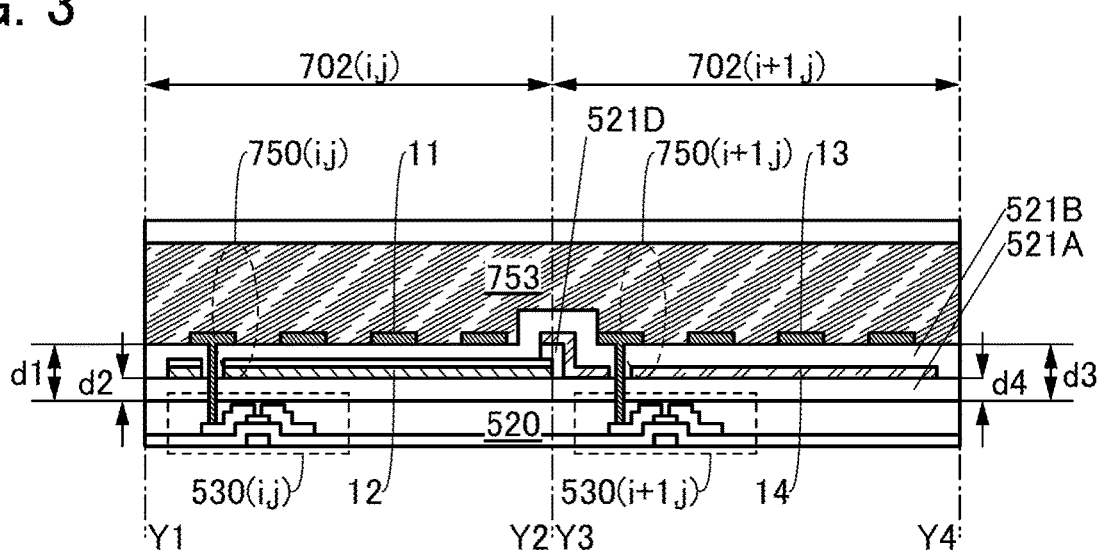
FIG. 3 is a cross-sectional view illustrating a structure of a pixel of a display panel of an embodiment.

FIG. 3 illustrates a structure of the display panel of one embodiment of the present invention. FIG. 3 is a cross-sectional view of portions corresponding to the cutting line Y1-Y2 and the cutting line Y3-Y4 in FIG. 1B.

Figure 5A:
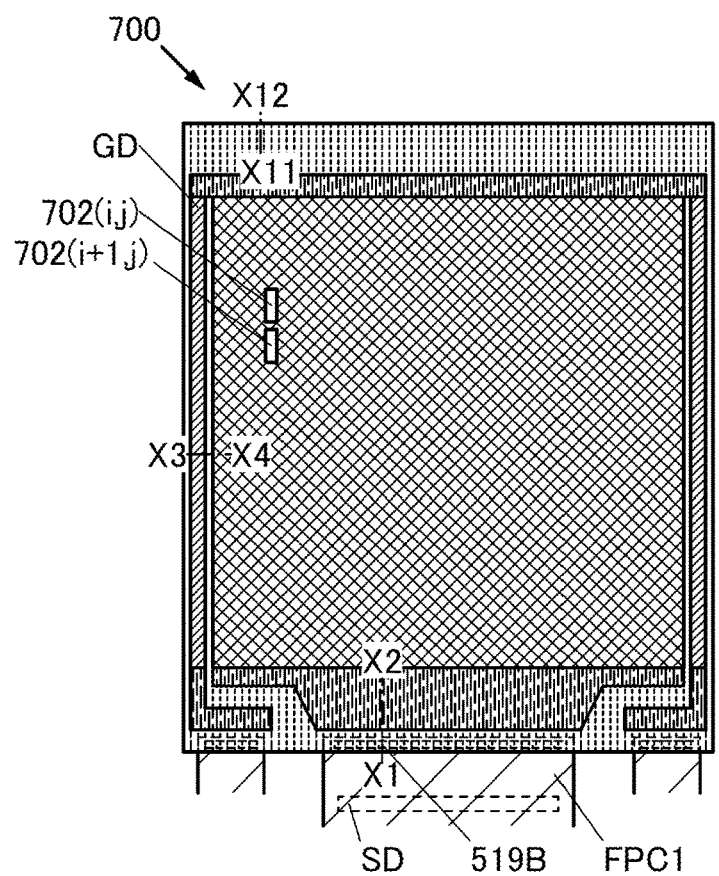
FIGS. 5A to 5C are top views and a cross-sectional view illustrating a structure of a display panel of an embodiment.
Figure 5B:
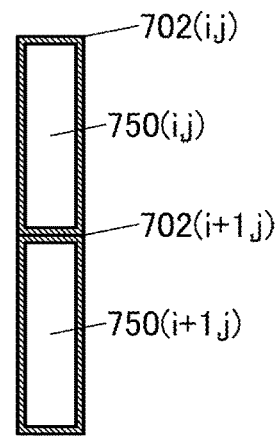
Figure 5C:
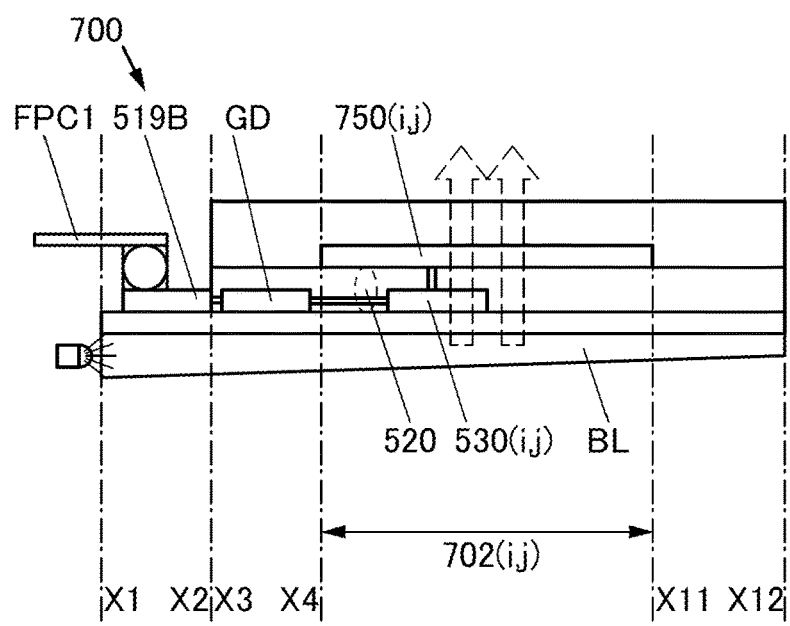

FIGS. 5A to 5C illustrate a structure of the display panel of one embodiment of the present invention. FIG. 5A is a top view of the display panel, and FIG. 5B is a top view illustrating part of pixels of the display panel shown in FIG. 5A. FIG. 5C is a schematic view illustrating a cross-sectional structure of the display panel shown in FIG. 5A.

Figure 6A:
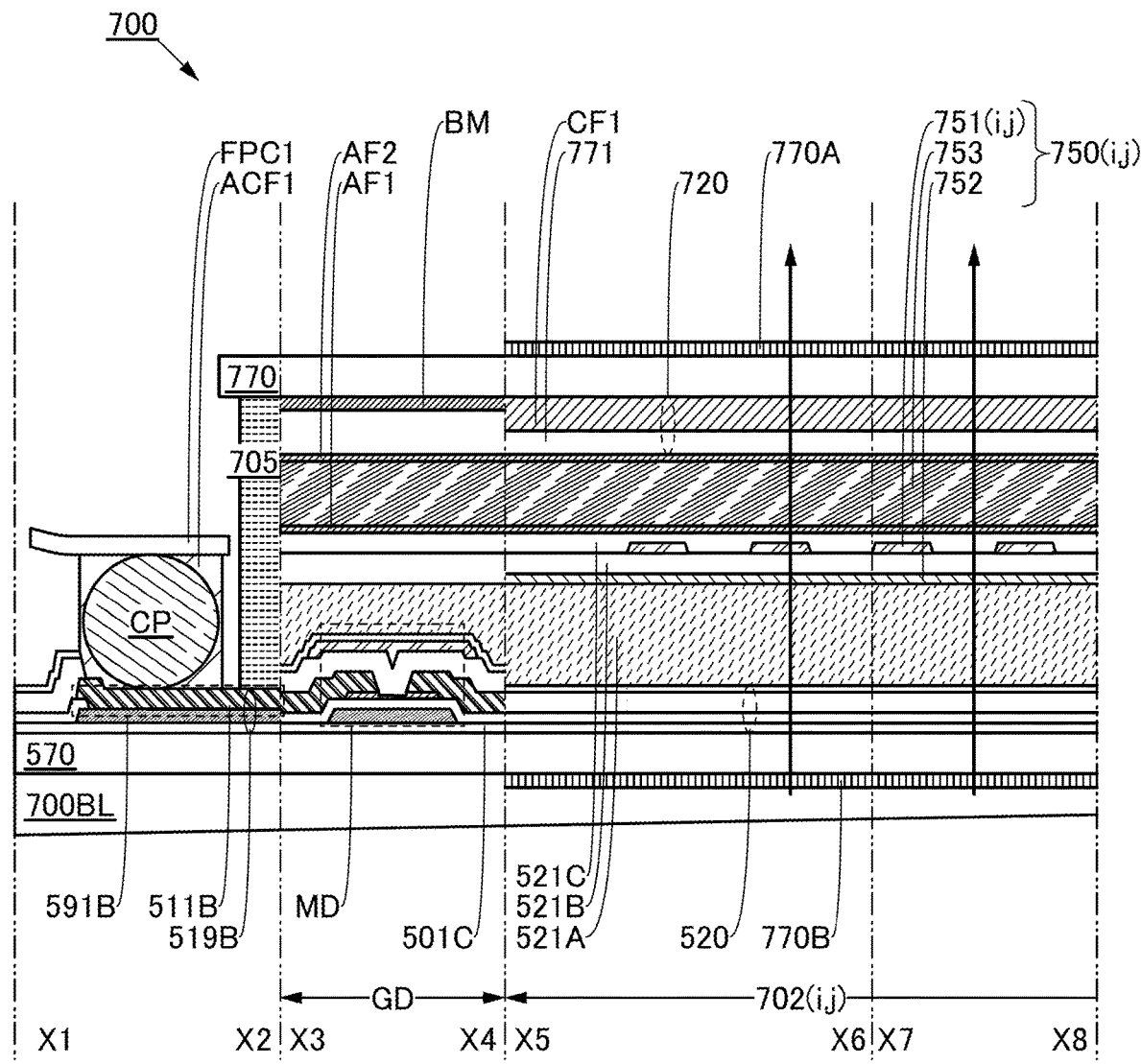
FIGS. 6A and 6B are cross-sectional views illustrating a structure of a display panel of an embodiment.
Figure 6B:
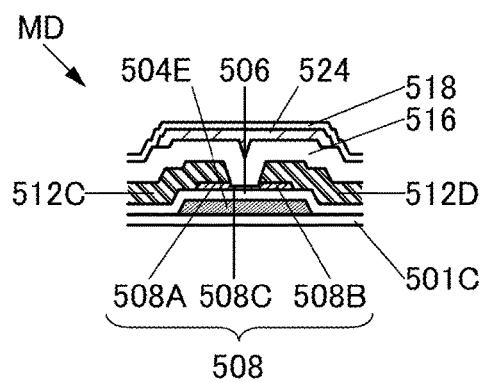

FIGS. 6A and 6B and FIGS. 7A and 7B are cross-sectional views illustrating a structure of the display panel. FIG. 6A is a cross-sectional view taken along the cutting line X1-X2 and the cutting line X3-X4 in FIG. 5A and the cutting line X5-X6 and the cutting line X7-X8 in FIG. 8. FIG. 6B illustrates part of FIG. 6A.

Figure 7A:
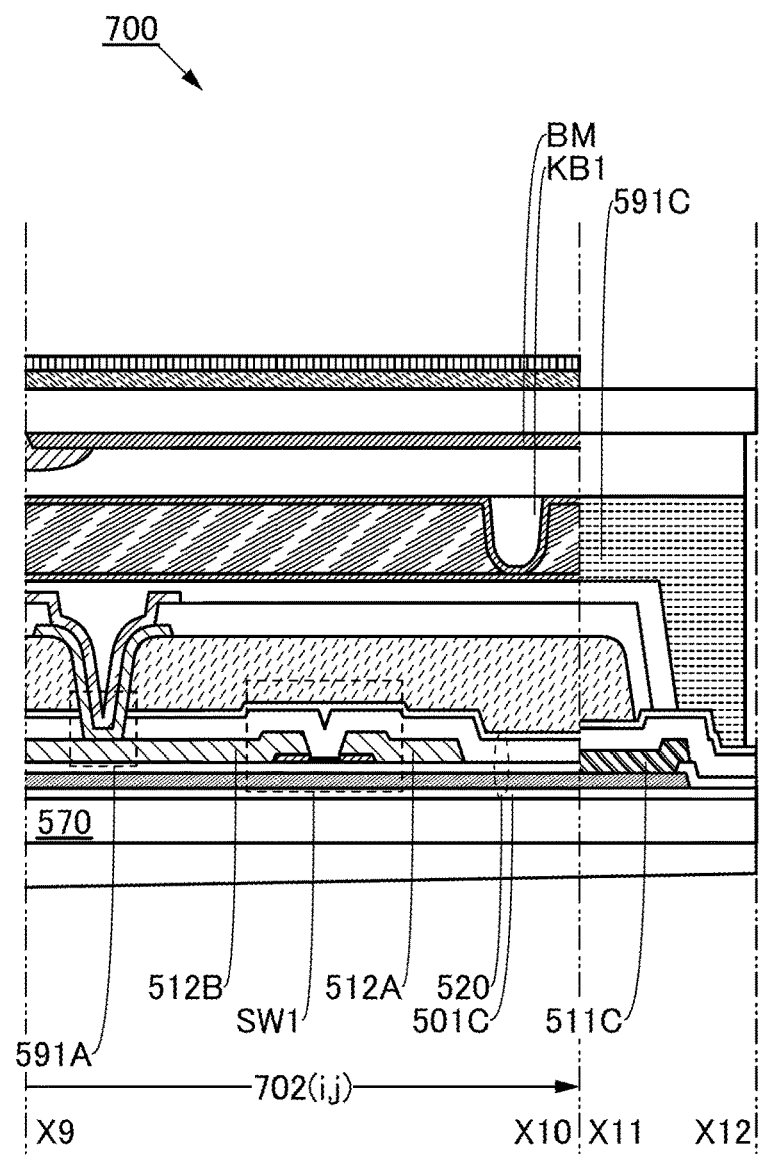
FIGS. 7A and 7B are cross-sectional views illustrating a structure of a display panel of an embodiment.
Figure 7B:
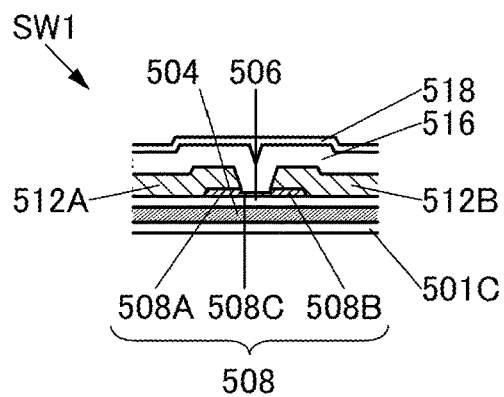
Figure 8:
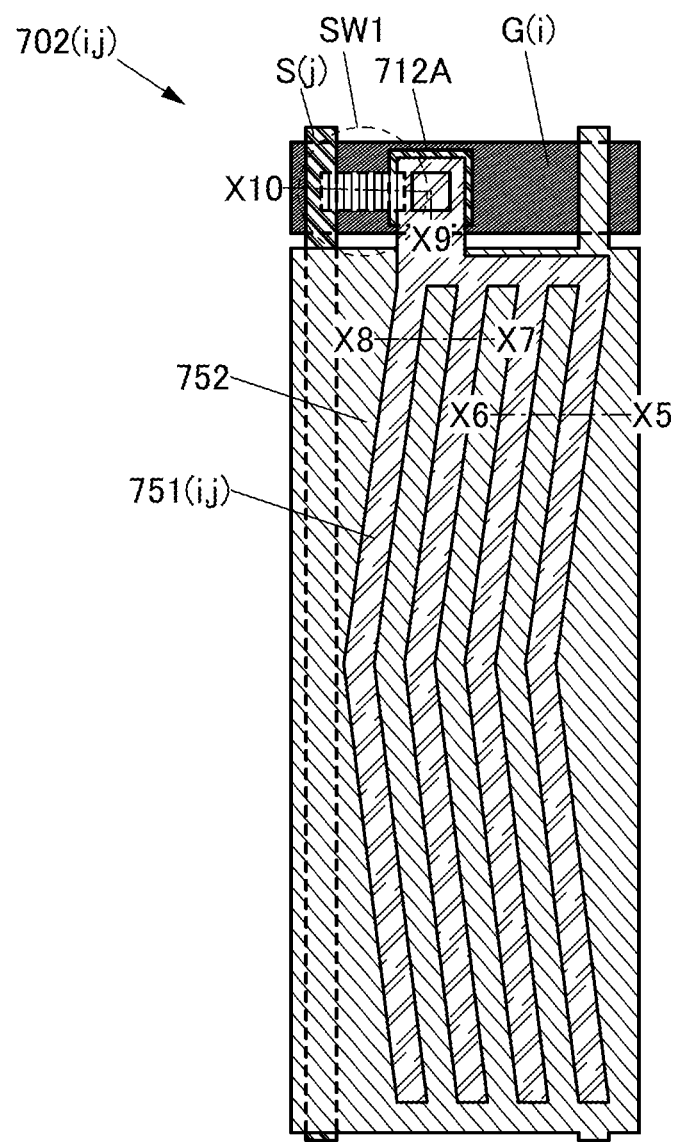
FIG. 8 is a bottom view illustrating a structure of a pixel of a display panel of an embodiment.

FIG. 7A is a cross-sectional view taken along the cutting line X9-X10 in FIG. 8 and the cutting line X11-X12 in FIG. 5A. FIG. 7B illustrates part of FIG. 7A.

FIG. 8 is a bottom view illustrating a pixel of the display panel shown in FIG. 5A.

Figure 9:
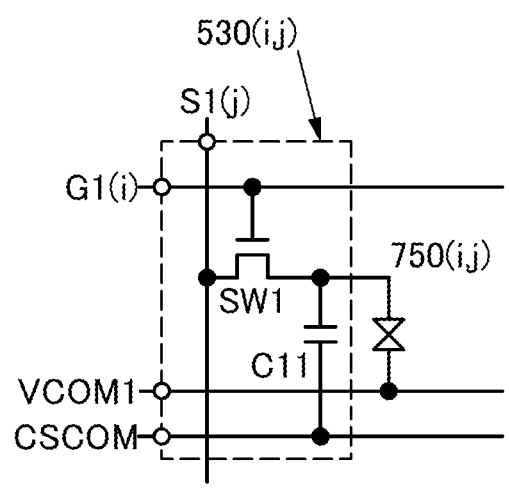
FIG. 9 is a circuit diagram illustrating a pixel circuit of a display panel of an embodiment.

FIG. 9 is a circuit diagram illustrating a structure of a pixel circuit included in the display panel of one embodiment of the present invention.

Note that in this specification, an integral variable of 1 or more may be used for reference numerals. For example, "(p)" where p is an integral value of 1 or more may be used for part of a reference numeral that specifies any one of components (p components at a maximum). For another example, "(m,n)" where each of m and n is an integral value of 1 or more may be used for part of a reference numeral that specifies any one of components (m×n components at a maximum).

Structure Example 1 of Display Panel

A display panel 700 described in this embodiment includes a pixel 702(i,j), a pixel 702(i+1,j), and a functional layer 520 (see FIG. 1A, FIG. 1B, or FIG. 5A).

Note that the display panel 700 includes a substrate 570 and a substrate 770. The substrate 770 includes a region positioned such that the pixel 702(i,j) and the pixel 702(i+1,j) are sandwiched between the region and the substrate 570.

Structure Example 1 of Pixel

The pixel 702(i,j) includes a pixel circuit 530(i,j) and a display element 750(i,j) (see FIG. 2A). For example, a transistor that is used for a switch can be used for the pixel circuit 530(i,j).

The pixel 702(i+1,j) includes a pixel circuit 530(i+1,j) and a display element 750(i+1,j).

The functional layer 520 includes a region overlapping with the display element 750(i,j), and the functional layer 520 includes a region overlapping with the display element 750(i+1,j). The functional layer 520 includes the pixel circuit 530(i,j), and the functional layer 520 includes the pixel circuit 530(i+1,j).

Note that the functional layer 520 includes a region sandwiched between the substrate 770 and the substrate 570.

Structure Example 1 of Display Element 750(i,j)

The display element 750(i,j) includes a first electrode 11, a second electrode 12, and a layer 753 containing a liquid crystal material.

A first distance d1 is provided between the first electrode 11 and the functional layer 520. The first electrode 11 includes a region overlapping with the layer 753 containing a liquid crystal material. The first electrode 11 has a comb-like shape. For example, an electrode having a bent comb-like shape can be used for the first electrode 11 (see FIG. 1A).

A second distance d2 is provided between the second electrode 12 and the functional layer 520. The second electrode 12 includes a region overlapping with the layer 753 containing a liquid crystal material, and the second electrode 12 includes a region overlapping with a space between teeth of the comb-like shape of the first electrode 11 (see FIG. 2A). The second distance d2 is shorter than the first distance d1.

Note that the layer 753 containing a liquid crystal material includes a region sandwiched between the substrate 770 and the functional layer 520.

Structure Example 1 of Display Element 750(i+1,j)

The display element 750(i+1,j) includes a third electrode 13, a fourth electrode 14, and the layer 753 containing a liquid crystal material. A material that can be used for the first electrode 11 can be used for the fourth electrode 14, for example. The fourth electrode 14 can be formed in a step of forming the first electrode 11.

A third distance d3 is provided between the third electrode 13 and the functional layer 520. The third electrode 13 includes a region overlapping with the layer 753 containing a liquid crystal material and has a comb-like shape.

A fourth distance d4 is provided between the fourth electrode 14 and the functional layer 520, and the fourth electrode 14 includes a region overlapping with the layer 753 containing a liquid crystal material and includes a region overlapping with a space between teeth of the comb-like shape of the third electrode 13. The fourth distance d4 is shorter than the third distance d3, and the third distance d3 is longer than the first distance d1.

For example, the thickness of the layer 753 containing a liquid crystal material in the display element 750(i+1,j) is the same as the thickness of the layer 753 containing a liquid crystal material in the display element 750(i,j).

Structure Example 2 of Pixel

The pixel circuit 530(i,j) is electrically connected to the first electrode 11. Note that an electrode that is the first electrode 11 or the second electrode 12 of the display element 750(i,j) and is electrically connected to the pixel circuit 530(i,j) is referred to as an electrode 751(i,j). An electrode that is the first electrode 11 or the second electrode 12 of the display element 750(i,j) and is not electrically connected to the pixel circuit 530(i,j) is referred to as an electrode 752(i,j). The electrode 752(i,j) is electrically connected to a wiring VCOM1, for example (see FIG. 9). Hence, in the structure example 2 of the pixel of this embodiment, the first electrode 11 and the second electrode 12 correspond to the electrode 751(i,j) and the electrode 752(i,j), respectively.

Thus, for example, on the basis of image data, a potential of the first electrode can be controlled. Furthermore, a predetermined electric field can be generated between the first electrode and the second electrode. Furthermore, the orientation of a liquid crystal included in the layer containing a liquid crystal material can be controlled. Consequently, a novel display panel that is highly convenient or reliable can be provided.

Structure Example 3 of Pixel

The pixel circuit 530(i+1,f) is electrically connected to the fourth electrode 14 (see FIG. 2A). Note that an electrode that is the third electrode 13 or the fourth electrode 14 of the display element 750(i+1,j) and is electrically connected to the pixel circuit 530(i+1,j) is referred to as an electrode 751(i+1,j). An electrode that is the third electrode 13 or the fourth electrode 14 of the display element 750(i+1,j) and is not electrically connected to the pixel circuit 530(i+1,j) is referred to as an electrode 752(i+1,j). The electrode 752(i+1,j) is electrically connected to the wiring VCOM1, for example (see FIG. 9). Hence, in the structure example 3 of the pixel of this embodiment, the third electrode 13 and the fourth electrode 14 correspond to the electrode 752(i+1,j) and the electrode 751(i+1,j), respectively.

Thus, for example, on the basis of image data, a potential of the fourth electrode can be controlled. Furthermore, a predetermined electric field can be formed between the third electrode and the fourth electrode. Furthermore, the orientation of the liquid crystal included in the layer containing a liquid crystal material can be controlled. Consequently, a novel display panel that is highly convenient or reliable can be provided.

Structure Example 4 of Pixel

The fourth distance d4 is equal to the first distance d1 (see FIG. 2A).

Thus, for example, on the basis of image data, a potential of the first electrode or a potential of the fourth electrode can be controlled. Furthermore, a predetermined electric field can be generated between the first electrode and the second electrode or between the third electrode and the fourth electrode. Furthermore, the orientation of the liquid crystal included in the layer containing a liquid crystal material can be controlled. Consequently, a novel display panel that is highly convenient or reliable can be provided.

Structure Example 5 of Pixel

The fourth distance d4 is equal to the second distance d2, and the pixel circuit 530(i,j) is electrically connected to the second electrode 12 (see FIG. 2B). Note that in the structure example 5 of the pixel of this embodiment, the second electrode 12 and the first electrode 11 correspond to the electrode 751(i,j) and the electrode 752(i,j), respectively. A material that can be used for the second electrode 12 can be used for the fourth electrode 14, for example. The fourth electrode 14 can be formed in a step of forming the second electrode 12.

Thus, for example, on the basis of image data, a potential of the second electrode can be controlled. Furthermore, a predetermined electric field can be generated between the first electrode and the second electrode. Furthermore, the orientation of the liquid crystal included in the layer containing a liquid crystal material can be controlled. Consequently, a novel display panel that is highly convenient or reliable can be provided.

Structure Example 6 of Pixel

The fourth distance d4 is equal to the second distance d2, and the pixel circuit 530(i+1,j) is electrically connected to the fourth electrode 14 (see FIG. 2B). Note that in the structure example 6 of the pixel of this embodiment, the third electrode 13 and the fourth electrode 14 correspond to the electrode 752(i+1,j) and the electrode 751(i+1,j), respectively.

Thus, for example, on the basis of image data, a potential of the fourth electrode can be controlled. Furthermore, a predetermined electric field can be generated between the third electrode and the fourth electrode. Furthermore, the orientation of the liquid crystal included in the layer containing a liquid crystal material can be controlled. Consequently, a novel display panel that is highly convenient or reliable can be provided.

Structure Example 7 of Pixel

The pixel 702(i,j) includes part of the functional layer 520 and the display element 750(i,j) (see FIG. 5C). The pixel 702(i,j) includes an insulating film 521A, an insulating film 521B, or an insulating film 521C (see FIG. 6A).

Structure Example 1 of Functional Layer

The functional layer 520 includes the pixel circuit 530(i,j) (see FIG. 7A). Note that the pixel circuit 530(i,j) includes a transistor that can be used for a switch SW1, for example.

The functional layer 520 includes an insulating film 518, an insulating film 516, an insulating film 506, an insulating film 501C, or the like (see FIGS. 6A and 6B).

<<Pixel Circuit 530(i,j)>>

The pixel circuit 530(i,j) has a function of driving the display element 750(i,j) (see FIG. 9).

A switch, a transistor, a diode, a resistor, an inductor, a capacitor, or the like can be used in the pixel circuit 530(i,j).

For example, one or a plurality of transistors can be used as a switch. A plurality of transistors connected in parallel, in series, or in combination of parallel connection and series connection can be used as a switch.

For example, the pixel circuit 530(i,j) is electrically connected to a signal line S1(j), a scan line G1(i), a wiring CSCOM, and the like (see FIG. 9).

The pixel circuit 530($i,j$) includes the switch SW1 and a capacitor C11.

For example, a transistor including a gate electrode electrically connected to the scan line G1($i$) and a first electrode electrically connected to the signal line S1($j$) can be used for the switch SW1.

The capacitor C11 includes a first electrode electrically connected to a second electrode of the transistor used as the switch SW1 and a second electrode electrically connected to the wiring CSCOM.

The electrode 751($i,j$) of the display element 750($i,j$) is electrically connected to the second electrode of the transistor used as the switch SW1. The electrode 752($i,j$) of the display element 750($i,j$) is electrically connected to the wiring VCOM1. This makes it possible to drive the display element 750($i,j$).

Specifically, in an opening 591A, the electrode 751($i,j$) is electrically connected to a conductive film 512B (see FIG. 7A). Furthermore, the signal line S1($j$) not shown is electrically connected to a conductive film 512A.

<<Insulating Film 501C, Insulating Film 518, Insulating Film 516, Insulating Film 506, and the Like>>

The insulating film 501C includes a region sandwiched between the pixel circuit 530($i,j$) and the substrate 570 (see FIG. 7A).

The insulating film 518 includes a region sandwiched between the display element 750($i,j$) and the pixel circuit 530($i,j$) (see FIGS. 7A and 7B).

The insulating film 516 includes a region sandwiched between the insulating film 518 and the insulating film 501C.

The insulating film 506 includes a region sandwiched between the insulating film 516 and the insulating film 501C.

<<Insulating Film 521A, Insulating Film 521B, and Insulating Film 521C>>

The insulating film 521A includes a region sandwiched between the display element 750($i,j$) and the functional layer 520. The insulating film 521A includes a region sandwiched between the functional layer 520 and the second electrode 12, and the insulating film 521A includes a region sandwiched between the functional layer 520 and the fourth electrode 14 (see FIG. 2A and FIG. 6A). Note that for example, in a structure including the insulating film 518, the insulating film 521A can be omitted.

The insulating film 521B includes a region sandwiched between the second electrode 12 and the first electrode 11, and the insulating film 521C includes a region sandwiched between the fourth electrode 14 and the third electrode 13. The insulating film 521B prevents a short circuit between the first electrode 11 and the second electrode 12, and the insulating film 521C prevents a short circuit between the third electrode 13 and the fourth electrode 14.

The insulating film 521C includes a region sandwiched between the first electrode 11 and the layer 753 containing a liquid crystal material, and the insulating film 521C includes a region sandwiched between the fourth electrode 14 and the layer 753 containing a liquid crystal material.

Structure Example 2 of Display Panel

Figure 11:
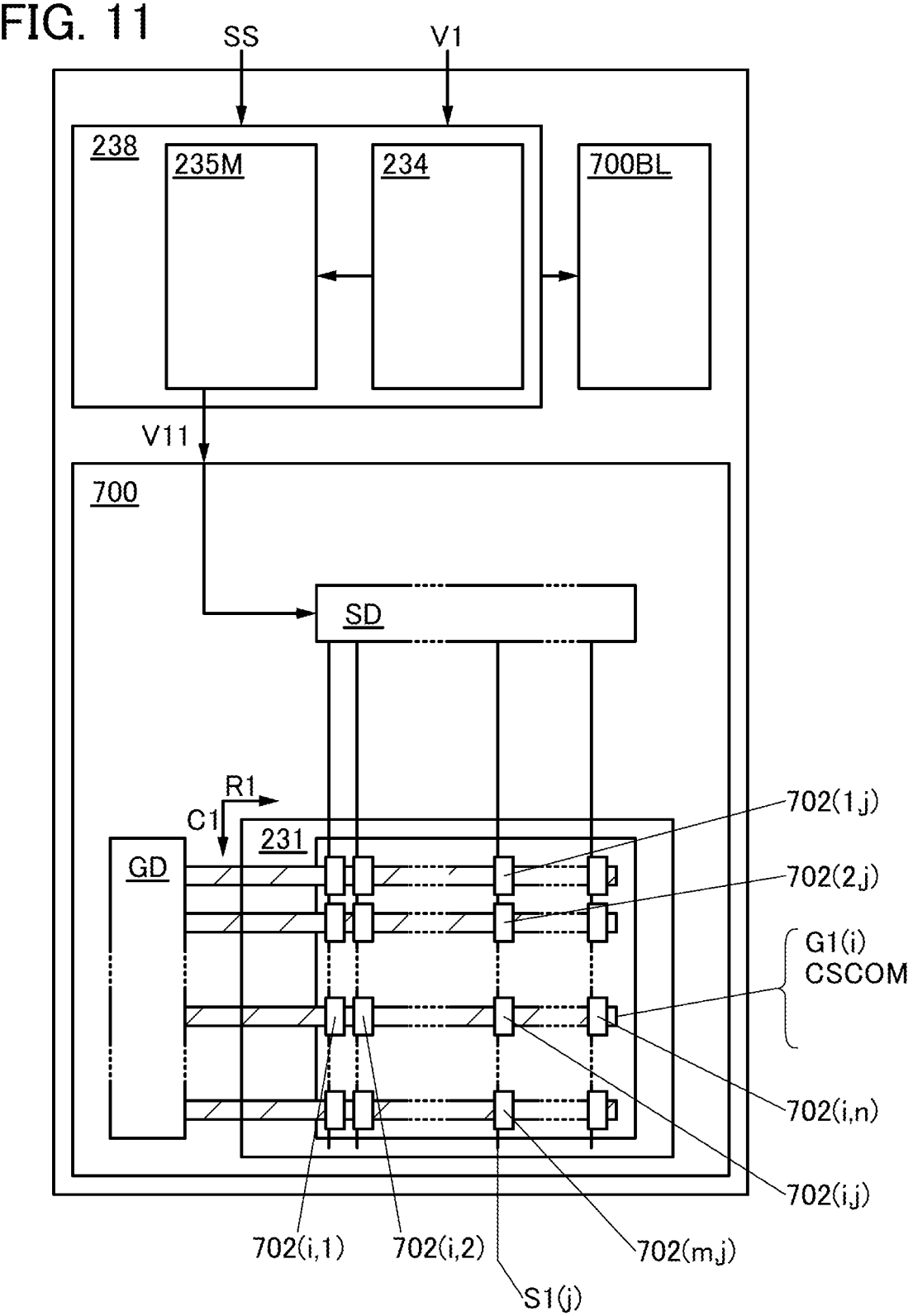
FIG. 11 is a block diagram illustrating a structure of a display device using a display panel of an embodiment.

The display panel 700 described in this embodiment includes a display region 231 (see FIG. 11).

<<Display Region 231>>

The display region 231 includes one group of pixels 702($i,1$) to 702($i,n$), another group of pixels 702($1,j$) to 702($m,j$), the scan line G1($i$), and the signal line S1($i$) (see FIG. 11). Note that i is an integer greater than or equal to 1 and less than or equal to m, j is an integer greater than or equal to 1 and less than or equal to n, and each of m and n is an integer greater than or equal to 1.

The one group of pixels 702($i,1$) to 702($i,n$) include the pixel 702($i,j$) and are arranged in the row direction (the direction indicated by the arrow R1 in the drawing).

The another group of pixels 702($1,j$) to 702($m,j$) include the pixel 702($i,j$) and are arranged in the column direction (the direction indicated by the arrow C1 in the drawing) that intersects the row direction.

The scan line G1($i$) is electrically connected to the one group of pixels 702($i,1$) to 702($i,n$) arranged in the row direction.

The signal line S1($j$) is electrically connected to the another group of pixels 702($1,j$) to 702($m,j$) arranged in the column direction.

Thus, image data can be supplied to a plurality of pixels. Furthermore, on the basis of the image data, a plurality of display elements can be driven. Furthermore, image data can be displayed using the display region. Consequently, a novel display panel that is highly convenient or reliable can be provided.

Structure Example 3 of Display Panel

The display panel 700 described in this embodiment includes a plurality of pixels. The plurality of pixels have a function of representing colors with different hues. Colors with hues that cannot be represented by each of the plurality of pixels can be represented by additive color mixing with the use of the plurality of pixels.

Structure Example 8 of Pixel

Note that when a plurality of pixels capable of representing colors with different hues are used for color mixture, each of the pixels can be referred to as a subpixel. In addition, a set of subpixels can be referred to as a pixel.

Figure 10:
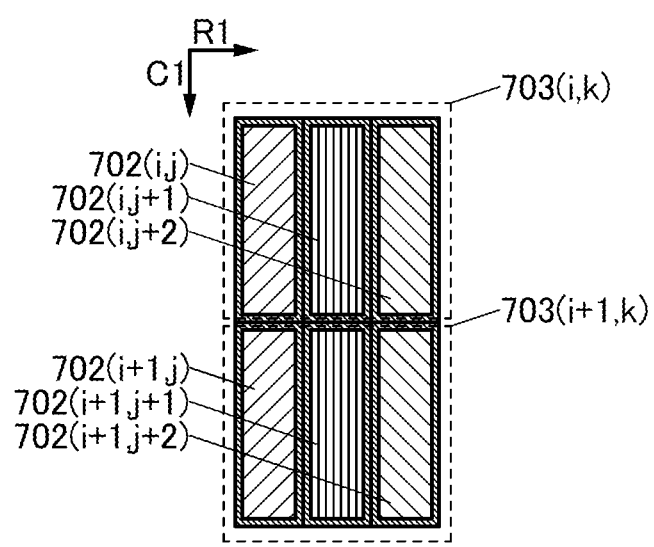
FIG. 10 is a top view illustrating pixels and subpixels of a display panel of an embodiment.

For example, the pixel 702($i,j$) can be referred to as a subpixel, and the pixel 702($i,j$), the pixel 702($i,j+1$), and the pixel 702($i,j+2$) can be collectively referred to as a pixel 703($i,k$) (see FIG. 10). Note that k is an integer greater than or equal to 1 and less than or equal to n.

Specifically, a subpixel that represents blue, a subpixel that represents green, and a subpixel that represents red can be collectively used as the pixel 703($i,k$).

Alternatively, for example, a subpixel that represents cyan, a subpixel that represents magenta, and a subpixel that represents yellow can be collectively used as the pixel 703($i,k$).

Alternatively, for example, the above set to which a subpixel that represents white is added can be used as the pixel.

Structure Example 4 of Display Panel

The display panel 700 described in this embodiment can include a driver circuit GD or a driver circuit SD (see FIG. 5A and FIG. 11).

<<Driver Circuit GD>>

The driver circuit GD has a function of supplying a selection signal on the basis of control information.

For example, the driver circuit GD has a function of supplying a selection signal to one scan line at a frequency of 30 Hz or higher, preferably 60 Hz or higher, on the basis of control data. Accordingly, moving images can be smoothly displayed.

For example, the driver circuit GD has a function of supplying a selection signal to one scan line at a frequency of lower than 30 Hz, preferably lower than 1 Hz, more preferably less than once per minute, on the basis of control data. Accordingly, a still image can be displayed while flickering is suppressed.

A display panel can include a plurality of driver circuits. For example, a display panel 700B includes a driver circuit GDA and a driver circuit GDB (see FIGS. 12A, 12B1, 12B2, and 12B3).

For example, in the case where a plurality of driver circuits are provided, the driver circuits GDA and GDB may supply the selection signals at different frequencies. Specifically, the selection signal can be supplied at a higher frequency to a region on which a moving image are displayed than to a region on which a still image is displayed. Accordingly, a still image can be displayed in a region with reduced flickering, and moving images can be smoothly displayed in another region.

<<Driver Circuit SD>>

The driver circuit SD has a function of supplying an image signal on the basis of data V11 (see FIG. 11).

The driver circuit SD has a function of generating an image signal and supplying the image signal to a pixel circuit electrically connected to a display element. Specifically, the driver circuit SD has a function of generating a signal whose polarity is inverted. Thus, for example, a liquid crystal display element can be driven.

For example, any of a variety of sequential circuits, such as a shift register, can be used as the driver circuit SD. Specifically, an integrated circuit formed on a silicon substrate can be used as the driver circuit SD.

An integrated circuit can be mounted on a terminal by a chip on glass (COG) method or a chip on film (COF) method, for example. Specifically, an anisotropic conductive film can be used to mount an integrated circuit on the terminal.

Structure Example 5 of Display Panel

The display panel 700 described in this embodiment further includes a terminal 519B, a functional layer 720, the substrate 570, the substrate 770, a bonding layer, a sealing material 705, a structure KB1, a functional film 770A, a functional film 770B, and the like (see FIG. 6A and FIG. 7A).

<<Terminal 519B>>

The terminal 519B includes a conductive film 511B, for example. The terminal 519B can be electrically connected to the signal line S1($j$), for example.

<<Functional layer 720>>

The functional layer 720 includes a region sandwiched between the substrate 770 and the display element 750($i,j$) (see FIG. 6A).

The functional layer 720 includes a light-blocking film BM, a coloring film CF1, or an insulating film 771.

The light-blocking film BM includes an opening in a region overlapping with the display element 750($i,j$) (see FIG. 6A or FIG. 7A).

The coloring film CF1 includes a region sandwiched between the substrate 770 and the display element 750($i,j$).

The insulating film 771 includes a region sandwiched between the coloring film CF1 and the layer 753 containing a liquid crystal material or a region sandwiched between the light-blocking film BM and the layer 753 containing a liquid crystal material. The insulating film 771 can reduce unevenness due to the thickness of the coloring film CF1. Furthermore, impurities can be prevented from diffusing from the light-blocking film BM, the coloring film CF1, or the like to the layer 753 containing a liquid crystal material.

<<Substrate 570 and Substrate 770>>

The substrate 770 includes a region overlapping with the substrate 570. The substrate 770 includes a region provided such that the functional layer 520 is positioned between the substrate 770 and the substrate 570.

The substrate 770 includes a region overlapping with the display element 750($i,j$).

<<Sealing Material 705 and Structure KB1>>

The sealing material 705 includes a region sandwiched between the substrate 570 and the substrate 770, and has a function of bonding the substrate 570 and the substrate 770 together.

The structure KB1 has a function of providing a certain space between the functional layer 520 and the substrate 770.

<<Functional Film 770A, Functional Film 770B, and the Like>>

The display element 750($i,j$) includes a region sandwiched between the functional film 770A and the functional film 770B.

Example of Components

The display panel 700 includes the substrate 570, the substrate 770, the structure KB1, or the sealing material 705.

The display panel 700 includes the functional layer 520, the insulating film 521A, the insulating film 521B, the insulating film 521C, the insulating film 518, the insulating film 516, the insulating film 506, or the insulating film 501C.

The display panel 700 includes the signal line S1($j$), the scan line G1($i$), the wiring VCOM1, or the wiring CSCOM.

The display panel 700 includes the terminal 519B, the conductive film 511B, or a conductive film 511C.

The display panel 700 includes the pixel circuit 530($i,j$) or the switch SW1.

The display panel 700 includes the display element 750($i,j$), the electrode 751($i,j$), the layer 753 containing a liquid crystal material, or the electrode 752($i,j$).

The display panel 700 includes an alignment film AF1, an alignment film AF2, the coloring film CF1, the light-blocking film BM, the insulating film 771, the functional film 770A, or the functional film 770B.

The display panel 700 includes the driver circuit GD or the driver circuit SD.

<<Substrate 570>>

The substrate 570 can be formed using a material having heat resistance high enough to withstand heat treatment in the manufacturing process. For example, a material with a thickness greater than or equal to 0.1 mm and less than or equal to 0.7 mm can be used for the substrate 570. Specifically, a material polished to a thickness of approximately 0.1 mm can be used.

For example, a large-sized glass substrate having any of the following sizes can be used for the substrate 570: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the substrate 570, an organic material, an inorganic material, a composite material of an organic material and an inorganic material, or the like can be used. For example, an inorganic material such as glass, ceramic, or a metal can be used for the substrate 570.

Specifically, non-alkali glass, soda-lime glass, potash glass, crystal glass, aluminosilicate glass, tempered glass, chemically tempered glass, quartz, sapphire, or the like can be used for the substrate 570 or the like. Specifically, an inorganic oxide film, an inorganic nitride film, an inorganic oxynitride film, or the like can be used for the substrate 570 or the like. For example, a silicon oxide film, a silicon nitride film, a silicon oxynitride film, an aluminum oxide film, or the like can be used for the substrate 570. Stainless steel, aluminum, or the like can be used for the substrate 570.

For example, a single crystal semiconductor substrate or a polycrystalline semiconductor substrate of silicon or silicon carbide, a compound semiconductor substrate of silicon germanium, or an SOI substrate can be used for the substrate 570. Thus, a semiconductor element can be formed over the substrate 570.

An organic material such as a resin, a resin film, or plastic can be used for the substrate 570. Specifically, a resin film or resin plate of polyester, polyolefin, polyamide, polyimide, polycarbonate, an acrylic resin, or the like can be used for the substrate 570.

For example, a composite material, such as a resin film to which a metal plate, a thin glass plate, or an inorganic film is bonded can be used for the substrate 570. For example, a composite material formed by dispersing a fibrous or particulate metal, glass, inorganic material, or the like into a resin film can be used for the substrate 570. For example, a composite material formed by dispersing a fibrous or particulate resin, organic material, or the like into an inorganic material can be used for the substrate 570.

A single-layer material or a stacked-layer material in which a plurality of layers are stacked can be used for the substrate 570. For example, a stacked-layer material in which a base, an insulating film that prevents diffusion of impurities contained in the base, and the like are stacked can be used for the substrate 570. Specifically, a stacked-layer material in which glass and one or a plurality of films that prevent diffusion of impurities contained in the glass and that are selected from a silicon oxide layer, a silicon nitride layer, a silicon oxynitride layer, and the like are stacked can be used for the substrate 570. Alternatively, a stacked-layer material in which a resin and a film for preventing diffusion of impurities that penetrate the resin, such as a silicon oxide film, a silicon nitride film, and a silicon oxynitride film are stacked can be used for the substrate 570.

Specifically, a resin film, a resin plate, a layered material, or the like of polyester, polyolefin, polyamide, polyimide, polycarbonate, an acrylic resin, or the like can be used for the substrate 570 or the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the substrate 570.

Specifically, polyethylene terephthalate (PET), polyethylene naphthalate (PEN), polyethersulfone (PES), acrylic, or the like can be used for the substrate 570. Alternatively, a cyclo olefin polymer (COP), a cyclo olefin copolymer (COC), or the like can be used.

Alternatively, paper, wood, or the like can be used for the substrate 570.

For example, a flexible substrate can be used for the substrate 570.

Note that a transistor, a capacitor, or the like can be directly formed on the substrate. Alternatively, a transistor, a capacitor, or the like formed on a substrate for use in manufacturing processes that can resist heat applied in the manufacturing process can be transferred to the substrate 570. Thus, a transistor, a capacitor, or the like can be formed over a flexible substrate, for example.

<<Substrate 770>>

For example, any of the materials applicable to the substrate 570 can be used for the substrate 770. For example, a light-transmitting material selected from the materials applicable to the substrate 570 can be used for the substrate 770. Alternatively, a material that has a surface provided with an antireflective film with a thickness of 1 μm or less can be used for the substrate 770. Specifically, a stacked-layer film in which three or more, preferably five or more, further preferably 15 or more dielectrics are stacked can be used for the substrate 770. This allows reflectivity to be as low as 0.5% or less, preferably 0.08% or less. Furthermore, a material with low birefringence that is selected from the materials applicable to the substrate 570 can be used for the substrate 770.

For example, aluminosilicate glass, tempered glass, chemically tempered glass, sapphire, or the like can be favorably used for the substrate 770 that is on a side closer to a user of the display panel. This can prevent breakage or damage of the display panel caused by the use.

For example, a resin film of a cyclo olefin polymer (COP), a cyclic olefin copolymer (COC), or triacetyl cellulose (TAC) can be favorably used for the substrate 770. As a result, the substrate 770 can be light-weight. Alternatively, for example, the display panel can be made less likely to suffer from damage by dropping or the like.

A material with a thickness greater than or equal to 0.1 mm and less than or equal to 0.7 mm can be also used for the substrate 770, for example. Specifically, a substrate polished for reducing the thickness can be used. Thus, the functional film 770A can be located so as to be close to the display element 750($i,j$). As a result, image blur can be reduced and an image can be displayed clearly.

<<Structure KB1>>

An organic material, an inorganic material, or a composite material of an organic material and an inorganic material can be used for the structure KB1. Accordingly, a predetermined space can be provided between components between which the structure KB1 and the like are provided.

Specifically, for the structure KB1, polyester, polyolefin, polyamide, polyimide, polycarbonate, polysiloxane, an acrylic resin, or the like, or a composite material of a plurality of resins selected from these can be used. Alternatively, a photosensitive material may be used.

<<Sealing Material 705>>

For the sealing material 705, an inorganic material, an organic material, a composite material of an inorganic material and an organic material, or the like can be used.

For example, an organic material such as a thermally fusible resin or a curable resin can be used for the sealing material 705.

For example, an organic material such as a reactive curable adhesive, a light curable adhesive, a thermosetting adhesive, and/or an anaerobic adhesive can be used for the sealing material 705.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin, or the like can be used for the sealing material 705.

<<Insulating Film 521A, Insulating Film 521B, or Insulating Film 521C>>

For example, an insulating inorganic material, an insulating organic material, or an insulating composite material containing an inorganic material and an organic material can be used for the insulating film 521A, the insulating film 521B, or the insulating film 521C.

Specifically, an inorganic oxide film, an inorganic nitride film, an inorganic oxynitride film, and the like, or a layered material obtained by stacking some of these films can be used for the insulating film 521A, the insulating film 521B, or the insulating film 521C.

For example, a film including any of a silicon oxide film, a silicon nitride film, a silicon oxynitride film, and an aluminum oxide film, and the like, or a film including a material obtained by stacking any of these films can be used for the insulating film 521A, the insulating film 521B, or the insulating film 521C.

Note that the silicon nitride film is a dense film and has an excellent function of suppressing diffusion of impurities. Accordingly, in particular, the silicon nitride film can be suitably used for the insulating film 521A, the insulating film 521B, the insulating film 521C, or the like.

For example, polyester, polyolefin, polyamide, polyimide, polycarbonate, polysiloxane, an acrylic resin, or a layered or composite material including resins selected from these, or the like can be used for the insulating film 521A, the insulating film 521B, or the insulating film 521C. Alternatively, a photosensitive material may be used. Thus, with the insulating film 521A, the insulating film 521B, and the insulating film 521C, steps due to various components overlapping with the insulating film 521A, the insulating film 521B, and the insulating film 521C, for example, can be reduced.

Note that polyimide is excellent in the following properties compared with other organic materials: thermal stability, an insulating property, toughness, a low dielectric constant, a low coefficient of thermal expansion, and high chemical resistance, for example. Accordingly, in particular, polyimide can be suitably used for the insulating film 521A, the insulating film 521B, or the insulating film 521C, or the like.

<<Insulating Film 518>>

For example, any of the materials that can be used for the insulating film 521A, the insulating film 521B, or the insulating film 521C can be used for the insulating film 518.

For example, a material that has a function of suppressing diffusion of oxygen, hydrogen, water, alkali metal, alkaline earth metal, and the like can be used for the insulating film 518. Specifically, a nitride insulating film can be used for the insulating film 518. For example, silicon nitride, silicon nitride oxide, aluminum nitride, aluminum nitride oxide, or the like can be used for the insulating film 518. Thus, impurity diffusion to a semiconductor film of the transistor can be suppressed. For example, diffusion of oxygen from an oxide semiconductor film used as the semiconductor film of the transistor to the outside of the transistor can be suppressed. Alternatively, diffusion of hydrogen, water, or the like from the outside of the transistor to the oxide semiconductor film can be suppressed.

For example, a material having a function of supplying hydrogen or nitrogen can be used for the insulating film 518. Thus, hydrogen or nitrogen can be supplied to a film in contact with the insulating film 518. For example, the insulating film 518 is formed in contact with the oxide semiconductor film to supply hydrogen or nitrogen to the oxide semiconductor film. Furthermore, the oxide semiconductor film can have conductivity. Furthermore, the oxide semiconductor film can be used as a second gate electrode.

<<Insulating Film 516>>

For example, any of the materials that can be used for the insulating film 521A, the insulating film 521B, or the insulating film 521C can be used for the insulating film 516. Specifically, a stacked-layer film in which films formed by different manufacturing methods are stacked can be used for the insulating film 516.

For example, a stacked-layer film in which a first film containing silicon oxide, silicon oxynitride, or the like having a thickness greater than or equal to 5 nm and less than or equal to 150 nm, preferably greater than or equal to 5 nm and less than or equal to 50 nm and a second film containing silicon oxide, silicon oxynitride, or the like having a thickness greater than or equal to 30 nm and less than or equal to 500 nm, preferably greater than or equal to 50 nm and less than or equal to 400 nm are stacked can be used for the insulating film 516.

Specifically, a film in which the spin density of a signal that appears at g=2.001 due to a dangling bond of silicon, which can be observed by ESR measurement, is lower than or equal to $3\times10^{17}$ spins/cm$^3$ is preferably used for the first film. Thus, for example, the oxide semiconductor film used as the semiconductor film of the transistor can be protected from damage due to formation of the insulating film. Furthermore, oxygen trapped by defects of silicon can be reduced. Furthermore, transmission or transfer of oxygen can be easily performed.

Furthermore, for example, a material in which the spin density of a signal that appears at g=2.001 due to a dangling bond of silicon, which can be observed by ESR measurement, is lower than $1.5\times10^{18}$ spins/cm$^3$, or lower than or equal to $1\times10^{18}$ spins/cm$^3$, is preferably used for the second film.

<<Insulating Film 506>>

For example, any of the materials that can be used for the insulating film 521A, the insulating film 521B, or the insulating film 521C can be used for the insulating film 506. Specifically, a stacked-layer film in which a first film having a function of suppressing transmission of oxygen and a second film having a function of supplying oxygen are stacked can be used for the insulating film 506. Thus, for example, oxygen can be diffused to the oxide semiconductor film used as the semiconductor film of the transistor.

Specifically, a film including a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, or a neodymium oxide film can be used for the insulating film 506.

For example, a film formed in an oxygen atmosphere can be used for the second film. A film to which oxygen is introduced after formation can be used for the second film. Specifically, oxygen can be introduced after formation by an ion implantation method, an ion doping method, a plasma immersion ion implantation method, plasma treatment, or the like.

<<Insulating Film 501C>>

For example, any of the materials that can be used for the insulating film 521A, the insulating film 521B, or the insulating film 521C can be used for the insulating film 501C. Specifically, a material containing silicon and oxygen can be used for the insulating film 501C. Thus, diffusion of impurities into the pixel circuit, the second display element, or the like can be inhibited.

For example, a 200-nm-thick film containing silicon, oxygen, and nitrogen can be used for the insulating film 501C.

<<Wiring, Terminal, and Conductive Film>>

A conductive material can be used for the wiring or the like. Specifically, a conductive material can be used for the signal line $S1(j)$, the scan line $G1(i)$, the wiring CSCOM, the conductive film ANO, the terminal 519B, the conductive film 511B, the conductive film 511C, or the like.

For example, an inorganic conductive material, an organic conductive material, a metal, conductive ceramics, or the like can be used for the wiring or the like.

Specifically, for example, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film including graphene oxide is formed and is subjected to reduction, so that a film including graphene can be formed. As a reducing method, a method with application of heat, a method using a reducing agent, or the like can be employed.

A film containing a metal nanowire can be used for the wiring or the like, for example. Specifically, a nanowire containing silver can be used.

Specifically, a conductive polymer can be used for the wiring or the like.

Note that the terminal 519B can be electrically connected to a flexible printed circuit FPC1 using a conductive material ACF1, for example.

<<Display Element $750(i,j)$>>

For example, a display element having a function of controlling transmission or reflection of light can be used as the display element $750(i,j)$. Specifically, a combined structure of a liquid crystal element and a polarizing plate can be used as the display element $750(i,j)$.

For example, a liquid crystal element driven in any of the following driving modes can be used: an in-plane switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

The liquid crystal element used here can be driven also by a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode.

The display element $750(i,j)$ includes the first electrode, the second electrode, and the layer containing a liquid crystal material. The layer containing a liquid crystal material contains a liquid crystal material whose orientation is controlled by voltage applied between the first electrode and the second electrode. For example, the orientation of the liquid crystal material can be controlled by an electric field in the thickness direction (also referred to as the vertical direction) or an electric field in the direction that intersects the vertical direction (also referred to as the horizontal direction or the diagonal direction) of the layer containing a liquid crystal material.

With the use of a reflective display element such as a MEMS shutter display element or an optical interference MEMS display element, the power consumption of the display panel can be reduced. For example, a display element using a microcapsule method, an electrophoretic method, an electrowetting method, or the like can be used as the display element $750(i,j)$. Specifically, a reflective liquid crystal display element can be used as the display element $750(i,j)$.

<<Layer 753 Containing Liquid Crystal Material>>

For example, thermotropic liquid crystal, low-molecular liquid crystal, high-molecular liquid crystal, polymer dispersed liquid crystal, ferroelectric liquid crystal, anti-ferroelectric liquid crystal, or the like can be used for the layer containing a liquid crystal material. Alternatively, a liquid crystal material that exhibits a cholesteric phase, a smectic phase, a cubic phase, a chiral nematic phase, an isotropic phase, or the like can be used. Alternatively, a liquid crystal material that exhibits a blue phase can be used.

For example, a negative liquid crystal material can be used for the layer containing a liquid crystal material.

For example, a liquid crystal material having a resistivity of greater than or equal to $1.0 \times 10^{13}$ Ω·cm, preferably greater than or equal to $1.0 \times 10^{14}$ Ω·cm, further preferably greater than or equal to $1.0 \times 10^{15}$ Ω·cm, is used for the layer 753 containing a liquid crystal material. This can suppress a variation in the transmittance of the display element $750(i,j)$. Furthermore, flickering of the display element $750(i,j)$ can be suppressed. Furthermore, the rewriting frequency of the display element $750(i,j)$ can be reduced.

<<Electrode $751(i,j)$ or Electrode $751(i+1,j)$>>

For example, the material that is used for the wiring or the like can be used for the electrode $751(i,j)$ or the electrode $751(i+1,j)$. Specifically, a light-transmitting material or a conductive film having a reflecting property can be used for the electrode $751(i,j)$ or the electrode $751(i+1,j)$. For example, a stacked-layer film in which a light-transmitting conductive film and a reflective film having an opening are stacked can be used for the electrode $751(i,j)$ or the electrode $751(i+1,j)$.

<<Electrode $752(i,j)$ or Electrode $752(i+1,j)$>>

For example, the material that can be used for the wiring or the like can be used for the electrode $752(i,j)$ or the electrode $752(i+1,j)$. Specifically, a light-transmitting material or a conductive film having a reflecting property can be used for the electrode $752(i,j)$ or the electrode $752(i+1,j)$.

For example, a conductive oxide, a metal film thin enough to transmit light, a metal nanowire, or the like can be used for the electrode $752(i,j)$ or the electrode $752(i+1,j)$.

Specifically, a conductive oxide containing indium can be used for the electrode 752(i,j) or the electrode 752(i+1,j). A metal thin film with a thickness greater than or equal to 1 nm and less than or equal to 10 nm can be used for the electrode 752(i,j) or the electrode 752(i+1,j). A metal nanowire containing silver can be used for the electrode 752(i,j) or the electrode 752(i+1,j).

Specifically, indium oxide, indium tin oxide, indium zinc oxide, zinc oxide, zinc oxide to which gallium is added, zinc oxide to which aluminum is added, or the like can be used for the electrode 752(i,j) or the electrode 752(i+1,j).

<<Alignment Film AF1 or Alignment Film AF2>>

The alignment films AF1 and AF2 can be formed using a material containing polyimide or the like, for example. Specifically, a material formed by rubbing treatment or an optical alignment technique such that a liquid crystal material has a predetermined orientation can be used.

For example, a film containing soluble polyimide can be used for the alignment films AF1 and AF2. In this case, the temperature required in forming the alignment film AF1 can be low. Accordingly, damage to other components at the time of forming the alignment film AF1 can be suppressed.

<<Coloring Film CF1>>

A material that transmits light of a predetermined color can be used for the coloring film CF1. The coloring film CF1 that is formed using a material transmitting light of a predetermined color can be used as a color filter or the like.

For example, a material that transmits blue light, green light, or red light can be used for the coloring film CF1. In that case, the spectral width of light that is transmitted through the coloring film CF1 can be narrowed, so that clear display can be provided.

Furthermore, for example, a material that absorbs blue light, green light, or red light can be used for the coloring film CF1. Specifically, a material transmitting yellow light, magenta light, or cyan light can be used for the coloring film CF1. In that case, the spectral width of light that is absorbed by the coloring film CF1 can be narrowed, so that bright display can be provided.

<<Light-Blocking Film BM>>

For example, a material that suppresses light transmission can be used for the light-blocking film BM. The light-blocking film BM that is formed with a material that suppresses light transmission can be used as a black matrix, for example.

Specifically, a resin containing a pigment or dye can be used for the light-blocking film BM. For example, a resin in which carbon black is dispersed can be used for the light-blocking film.

Alternatively, an inorganic compound, an inorganic oxide, a composite oxide containing a solid solution of a plurality of inorganic oxides, or the like can be used for the light-blocking film BM. Specifically, a black chromium film, a film containing cupric oxide, or a film containing copper chloride, tellurium chloride, or the like can be used for the light-blocking film BM.

<<<Insulating Film 771>>

For example, any of the materials that can be used for the insulating film 521A, the insulating film 521B, or the insulating film 521C can be used for the insulating film 771. The insulating film 771 can be formed of polyimide, an epoxy resin, an acrylic resin, or the like. Thus, steps due to various components overlapping with the insulating film 771, for example, can be reduced.

<<Functional Film 770A or Functional Film 770B>>

For example, an anti-reflection film, a polarizing film, a retardation film, a light diffusion film, a condensing film, or the like can be used for the functional film 770A or the functional film 770B.

Specifically, a circularly polarizing film can be used for the functional film 770A. Furthermore, a light diffusion film can be used for the functional film 770A.

Furthermore, an antistatic film preventing the attachment of a foreign substance, a water repellent film preventing stains, an antireflection film, an anti-glare (non-glare) film, a hard coat film suppressing a scratch in use, or the like can be used for the functional film 770A.

<<Driver Circuit GD>>

Any of a variety of sequential circuits, such as a shift register, can be used as the driver circuit GD. For example, a transistor MD, a capacitor, and the like can be used in the driver circuit GD. Specifically, a transistor including a semiconductor film that can be formed in the same process as the semiconductor film of the transistor that can be used as the switch SW1 can be used.

As the transistor MD, a transistor having a different structure from the transistor that can be used for the switch SW1 can be used, for example. Specifically, the transistor MD can include a conductive film 524 having a region positioned such that a semiconductor film is sandwiched between the region and a gate electrode (see FIG. 6B).

Note that a transistor having the same structure as the transistor that can be used for the switch SW1 can be used for the transistor MD.

Structure Example 1 of Transistor

For example, semiconductor films formed in the same step can be used for transistors in the driver circuit and the pixel circuit.

As the transistor in the driver circuit or the pixel circuit, a bottom-gate transistor or a top-gate transistor can be used, for example.

A manufacturing line for a bottom-gate transistor including amorphous silicon as a semiconductor can be easily remodeled into a manufacturing line for a bottom-gate transistor including an oxide semiconductor as a semiconductor, for example. Furthermore, for example, a manufacturing line for a top-gate transistor including polysilicon as a semiconductor can be easily remodeled into a manufacturing line for a top-gate transistor including an oxide semiconductor as a semiconductor. In any reconstruction, a conventional manufacturing line can be effectively used.

For example, a transistor including a semiconductor containing an element belonging to Group 14 can be used. Specifically, a semiconductor containing silicon can be used for a semiconductor film. For example, single crystal silicon, polysilicon, microcrystalline silicon, or amorphous silicon can be used for the semiconductor film of the transistor.

Note that the temperature for forming a transistor using polysilicon as a semiconductor is lower than the temperature for forming a transistor using single crystal silicon as a semiconductor.

In addition, the field-effect mobility of the transistor using polysilicon as a semiconductor is higher than the field-effect mobility of the transistor using amorphous silicon as a semiconductor, and therefore a pixel including the transistor using polysilicon can have a high aperture ratio. Moreover, pixels arranged at high density, a gate driver circuit, and a source driver circuit can be formed over the same substrate.

As a result, the number of components included in an electronic device can be reduced.

In addition, the transistor using polysilicon as a semiconductor has higher reliability than the transistor using amorphous silicon as a semiconductor.

Alternatively, a transistor including a compound semiconductor can be used. Specifically, a semiconductor containing gallium arsenide can be used for the semiconductor film.

Alternatively, a transistor including an organic semiconductor can be used. Specifically, an organic semiconductor containing any of polyacenes and graphene can be used for the semiconductor film.

For example, a transistor using an oxide semiconductor for a semiconductor film can be used. Specifically, an oxide semiconductor containing indium or an oxide semiconductor containing indium, gallium, and zinc can be used for the semiconductor film.

For example, a transistor having a lower leakage current in an off state than a transistor that uses amorphous silicon for a semiconductor film can be used. Specifically, a transistor that uses an oxide semiconductor in a semiconductor film can be used.

Thus, a pixel circuit can hold an image signal for a longer time than a pixel circuit including a transistor that uses amorphous silicon for a semiconductor film. Specifically, the selection signal can be supplied at a frequency of lower than 30 Hz, preferably lower than 1 Hz, more preferably less than once per minute while flickering is suppressed. Consequently, eyestrain on a user of the display panel can be reduced, and power consumption for driving can be reduced.

Structure Example 2 of Transistor

For example, a transistor can be used as the switch SW1 (see FIG. 7B).

The transistor includes a semiconductor film 508, a conductive film 504, the conductive film 512A, and the conductive film 512B.

The semiconductor film 508 includes a region 508A electrically connected to the conductive film 512A and a region 508B electrically connected to the conductive film 512B (see FIG. 7B).

The semiconductor film 508 includes a region 508C overlapping with the conductive film 504 between the region 508A and the region 508B.

The conductive film 504 functions as a gate electrode.

The insulating film 506 includes a region sandwiched between the semiconductor film 508 and the conductive film 504. The insulating film 506 functions as a gate insulating film.

The conductive film 512A has one of a function as a source electrode and a function as a drain electrode, and the conductive film 512B has the other.

A conductive film in which a 10-nm-thick film containing tantalum and nitrogen and a 300-nm-thick film containing copper are stacked in this order can be used as the conductive film 504, for example. A film containing copper includes a region provided such that a film containing tantalum and nitrogen is positioned between the film containing copper and the insulating film 506.

For example, a stacked-layer film in which a 400-nm-thick film containing silicon and nitrogen and a 200-nm-thick film containing silicon, oxygen, and nitrogen are stacked can be used for the insulating film 506. Note that the film containing silicon and nitrogen includes a region provided such that the film containing silicon, oxygen, and nitrogen is positioned between the film containing silicon and nitrogen and the semiconductor film 508.

For example, a 25-nm-thick film containing indium, gallium, and zinc can be used as the semiconductor film 508.

Structure Example 3 of Transistor

A transistor including the conductive film 524 can be used as the transistor in the driver circuit or the pixel circuit (see FIG. 6B).

The conductive film 524 includes a region provided such that the semiconductor film 508 is positioned between the region and a conductive film 504E. The insulating film 516 includes a region sandwiched between the conductive film 524 and the semiconductor film 508. For example, the conductive film 524 can be electrically connected to a wiring supplying the same potential as that supplied to the conductive film 504E.

A conductive film in which a 10-nm-thick film containing tantalum and nitrogen and a 300-nm-thick film containing copper are stacked can be used as the conductive film 504E, for example. A film containing copper includes a region provided such that a film containing tantalum and nitrogen is positioned between the film containing copper and the insulating film 506.

For example, a conductive film in which a 50-nm-thick film containing tungsten, a 400-nm-thick film containing aluminum, and a 100-nm-thick film containing titanium are stacked in this order can be used as a conductive film 512C or a conductive film 512D. Note that the film containing tungsten includes a region in contact with the semiconductor film 508.

Structure Example 6 of Display Panel

A structure example of the display panel that is described in this embodiment includes the pixel 702($i,j$), the pixel 702($i+1,j$), and the functional layer 520 (see FIG. 2C).

Structure Example 9 of Pixel

The pixel 702($i,j$) includes the pixel circuit 530($i,j$) and the display element 750($i,j$) (see FIG. 2C).

The pixel 702($i+1,j$) includes the pixel circuit 530($i+1,j$) and the display element 750($i+1,j$).

The functional layer 520 includes the region overlapping with the display element 750($i,j$), and the functional layer 520 includes the region overlapping with the display element 750($i+1,j$). The functional layer 520 includes the pixel circuit 530($i,j$), and the functional layer 520 includes the pixel circuit 530($i+1,j$).

Note that the functional layer 520 includes the region sandwiched between the substrate 770 and the substrate 570.

Structure Example 2 of Display Element 750($i,j$)

The display element 750($i,j$) includes the first electrode 11, the second electrode 12, and the layer 753 containing a liquid crystal material.

The first distance d1 is provided between the first electrode 11 and the functional layer 520. The first electrode 11 includes the region overlapping with the layer 753 containing a liquid crystal material. The first electrode 11 has a comb-like shape. For example, an electrode having a bent comb-like shape can be used for the first electrode 11 (see FIG. 8).

The second distance d2 is provided between the second electrode 12 and the functional layer 520. The second electrode 12 includes the region overlapping with the layer 753 containing a liquid crystal material, and the second electrode 12 includes the region overlapping with the space between the teeth of the comb-like shape of the first electrode 11 (see FIG. 2C). The second distance d2 is shorter than the first distance d1.

Note that the layer 753 containing a liquid crystal material includes the region sandwiched between the substrate 770 and the functional layer 520.

Structure Example 2 of Display Element 750($i$+1,j)

The display element 750($i$+1,j) includes the third electrode 13, the fourth electrode 14, and the layer 753 containing a liquid crystal material. A material that can be used for the first electrode 11 can be used for the third electrode 13, for example. The third electrode 13 can be formed in the step of forming the first electrode 11.

The third distance d3 is provided between the third electrode 13 and the functional layer 520. The third electrode 13 includes the region overlapping with the layer 753 containing a liquid crystal material and has a comb-like shape.

The fourth distance d4 is provided between the fourth electrode 14 and the functional layer 520, and the fourth electrode 14 includes the region overlapping with the layer 753 containing a liquid crystal material and includes the region overlapping with the space between the teeth of the comb-like shape of the third electrode 13. The fourth distance d4 is shorter than the third distance d3, and the third distance d3 is longer than the first distance d1.

Structure Example 10 of Pixel

The pixel circuit 530($i$,$j$) is electrically connected to the first electrode 11 (see FIG. 2C). Note that in the structure example 10 of the pixel of this embodiment, the first electrode 11 and the second electrode 12 correspond to the electrode 751($i$,$j$) and the electrode 752($i$,$j$), respectively.

Thus, for example, on the basis of image data, a potential of the first electrode can be controlled. Furthermore, a predetermined electric field can be generated between the first electrode and the second electrode. Furthermore, the orientation of the liquid crystal included in the layer containing a liquid crystal material can be controlled. Consequently, a novel display panel that is highly convenient or reliable can be provided.

Structure Example 11 of Pixel

The pixel circuit 530($i$+1,j) is electrically connected to the third electrode 13 (see FIG. 2C). Note that in the structure example 11 of the pixel of this embodiment, the third electrode 13 and the fourth electrode 14 correspond to the electrode 751($i$+1,j) and the electrode 752($i$+1,j), respectively.

Thus, for example, on the basis of image data, a potential of the third electrode can be controlled. Furthermore, a predetermined electric field can be generated between the third electrode and the fourth electrode. Furthermore, the orientation of the liquid crystal included in the layer containing a liquid crystal material can be controlled. Consequently, a novel display panel that is highly convenient or reliable can be provided.

Structure Example 7 of Display Panel

The display panel 700 described in this embodiment includes the pixel 702($i$,$j$), the pixel 702($i$+1,j), the functional layer 520, and an insulating film 521D (see FIG. 3).

Structure Example 12 of Pixel

The pixel 702($i$,$j$) includes the pixel circuit 530($i$,$j$) and the display element 750($i$,$j$). The pixel 702($i$+1,j) includes the pixel circuit 530($i$+1,j) and the display element 750($i$+1,j).

The functional layer 520 includes the region overlapping with the display element 750($i$,$j$), and the functional layer 520 includes the region overlapping with the display element 750($i$+1,j). The functional layer 520 includes the pixel circuit 530($i$,$j$), and the functional layer 520 includes the pixel circuit 530($i$+1,j).

Structure Example 3 of Display Element 750($i$,$j$)

The display element 750($i$,$j$) includes the first electrode 11, the second electrode 12, and the layer 753 containing a liquid crystal material.

The first distance d1 is provided between the first electrode 11 and the functional layer 520. The first electrode 11 includes the region overlapping with the layer 753 containing a liquid crystal material. The first electrode 11 has a comb-like shape.

The second distance d2 is provided between the second electrode 12 and the functional layer 520. The second electrode 12 includes the region overlapping with the layer 753 containing a liquid crystal material, and the second electrode 12 includes the region overlapping with the space between the teeth of the comb-like shape of the first electrode 11. The second distance d2 is shorter than the first distance d1.

Structure Example 3 of Display Element 750($i$+1,j)

The display element 750($i$+1,j) includes the third electrode 13, the fourth electrode 14, and the layer 753 containing a liquid crystal material.

The third distance d3 is provided between the third electrode 13 and the functional layer 520. The third electrode 13 includes the region overlapping with the layer 753 containing a liquid crystal material and has a comb-like shape.

The fourth distance d4 is provided between the fourth electrode 14 and the functional layer 520, the fourth electrode 14 includes the region overlapping with the layer 753 containing a liquid crystal material and includes the region overlapping with the space between the teeth of the comb-like shape of the third electrode 13. The fourth electrode 14 includes a region overlapping with the second electrode 12. The fourth distance d4 is shorter than the third distance d3.

The insulating film 521D includes a region sandwiched between the second electrode 12 and the fourth electrode 14.

Note that the pixel circuit 530($i$,$j$) is electrically connected to the first electrode 11. In the structure example 3 of the display panel of this embodiment, the first electrode 11 and the second electrode 12 correspond to the electrode 751($i$,$j$) and the electrode 752($i$,$j$), respectively.

The pixel circuit 530($i$+1,j) is electrically connected to the third electrode 13. In the structure example 3 of the display panel of this embodiment, the third electrode 13 and the fourth electrode 14 correspond to the electrode 751(*i*+1,j) and the electrode 752(*i*+1,j), respectively.

Thus, for example, on the basis of image data, a predetermined electric field can be formed between the first electrode and the second electrode or between the third electrode and the fourth electrode. Furthermore, the orientation of the liquid crystal included in the layer containing a liquid crystal material can be controlled. Consequently, a novel display panel that is highly convenient or reliable can be provided.

Structure Example 8 of Display Panel

Figure 4A:
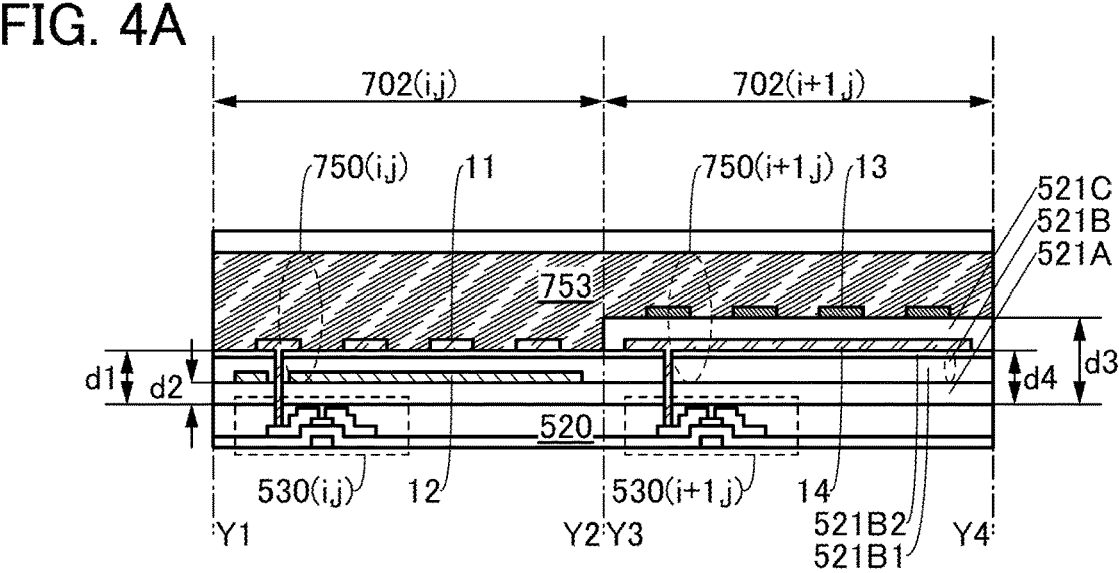
FIGS. 4A to 4C are cross-sectional views each illustrating a structure of a pixel of a display panel of an embodiment.

A display panel described with reference to FIG. 4A differs from the display panel described with reference to FIG. 2A in that the insulating film 521C is not provided between the electrode 11 and the layer 753 containing a liquid crystal material. The different portion will be described in detail below, and the above description is referred to for similar portions.

For example, the insulating film 521B includes an insulating film 521B1 and an insulating film 521B2. Specifically, a film that includes silicon oxide and is thinner than the insulating film 521B1 can be used for the insulating film 521B2.

For example, the thickness of the layer 753 containing a liquid crystal material in the display element 750(*i,j*) is larger than the thickness of the layer 753 containing a liquid crystal material in the display element 750(*i*+1,j).

For example, the distance between the electrode 13 and the electrode 14 can be set equal to the distance between the electrode 11 and the electrode 12.

Structure Example 9 of Display Panel

Figure 4B:
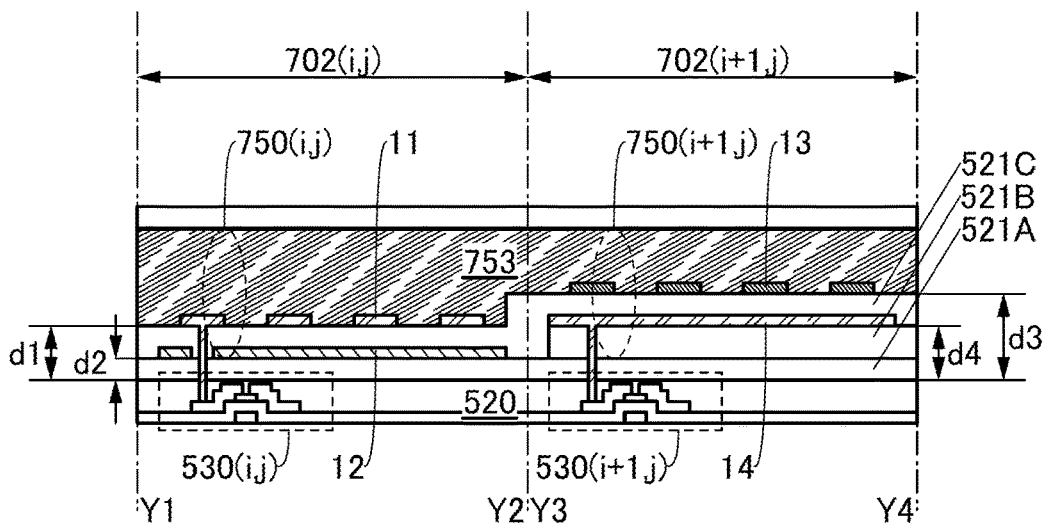

A display panel described with reference to FIG. 4B differs from the display panel described with reference to FIG. 2A in that the insulating film 521C is not provided between the electrode 11 and the layer 753 containing a liquid crystal material and that, instead of the insulating film 521B, the insulating film 521C is provided between the electrode 11 and the electrode 12. The different portions will be described in detail below, and the above description is referred to for similar portions.

For example, the thickness of the layer 753 containing a liquid crystal material in the display element 750(*i,j*) is larger than the thickness of the layer 753 containing a liquid crystal material in the display element 750(*i*+1,j).

For example, the distance between the electrode 13 and the electrode 14 can be set equal to the distance between the electrode 11 and the electrode 12.

Structure Example 10 of Display Panel

Figure 4C:
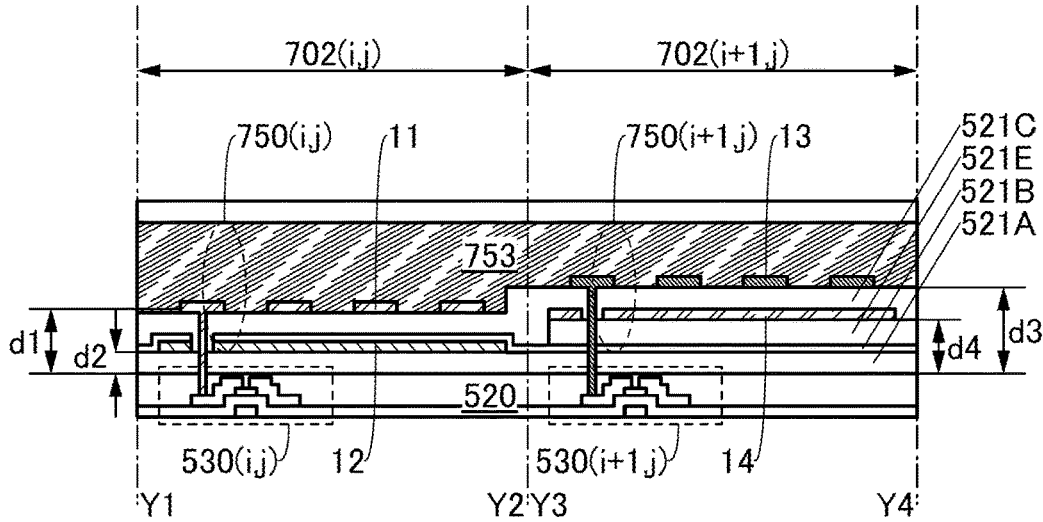

A display panel described with reference to FIG. 4C differs from the display panel described with reference to FIG. 2A in that the insulating film 521C is not provided between the electrode 11 and the layer 753 containing a liquid crystal material and that an insulating film 521E is provided between the electrode 14 and the insulating film 521B. The different portions will be described in detail below, and the above description is referred to for similar portions.

For example, a film that includes silicon oxide and is thinner than the insulating film 521C can be used for the insulating film 521B.

For example, a film including silicon nitride can be used for the insulating film 521E. The insulating film 521E can be formed using a resist mask that is the same as a resist mask used to form the fourth electrode.

For example, the thickness of the layer 753 containing a liquid crystal material in the display element 750(*i,j*) is larger than the thickness of the layer 753 containing a liquid crystal material in the display element 750(*i*+1,j).

Structure Example 11 of Display Panel

Figure 21A:
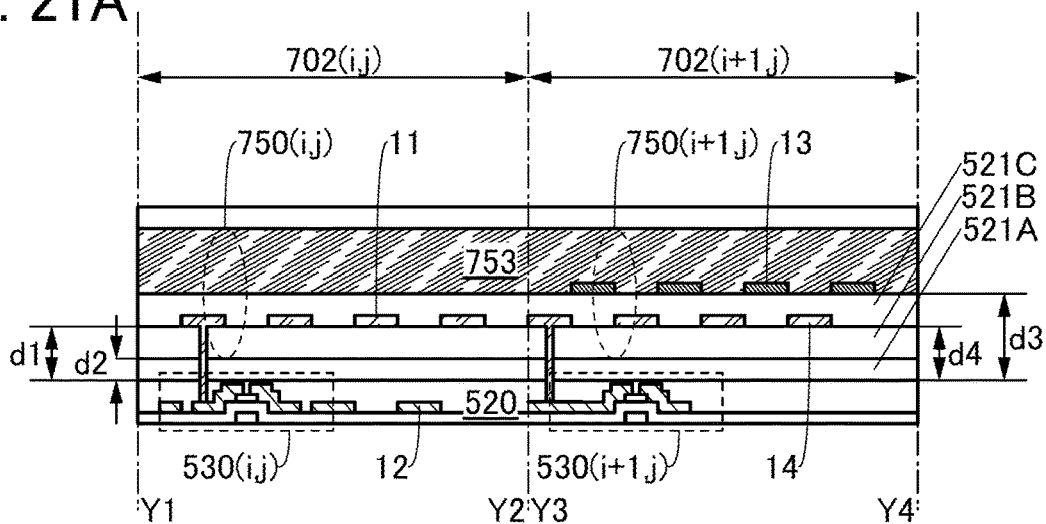
FIGS. 21A to 21C are cross-sectional views illustrating structures of a pixel of a display panel of an embodiment.
Figure 21B:
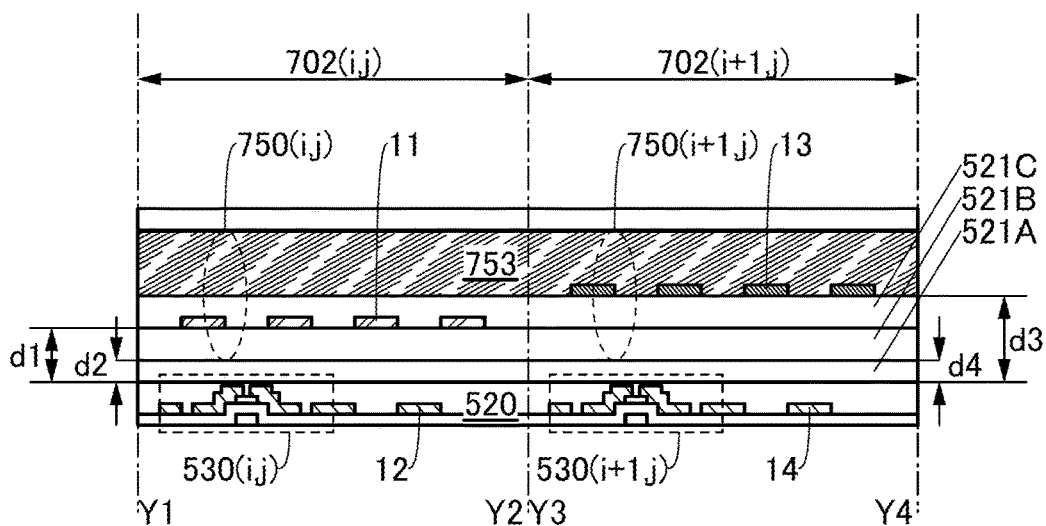
Figure 21C:
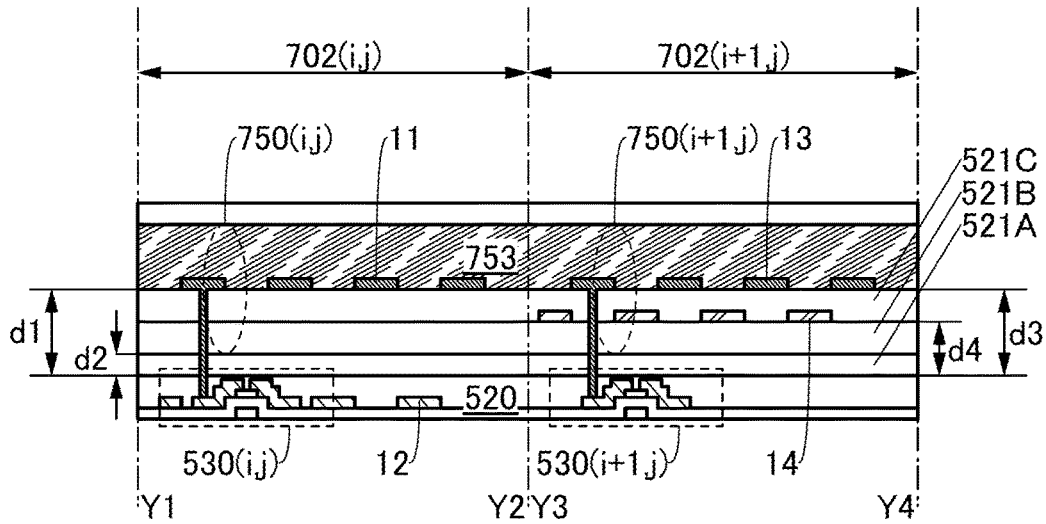

Display panels described with reference to FIGS. 21A to 21C differ from the display panels described with reference to FIGS. 2A to 2C in that a conductive film having a comb-like shape and overlapping with the space between the teeth of the comb-like shape of the electrode 11 is used for the electrode 12 and that a conductive film capable of being formed in a step of forming the source electrode or the drain electrode of the transistor in the pixel circuit 530(*i,j*) is used for the electrode 12.

Furthermore, the display panels described with reference to FIGS. 21A to 21C differ from the display panels described with reference to FIGS. 2A to 2C in that a conductive film having a comb-like shape and overlapping with the space between the teeth of the comb-like shape of the electrode 13 is used for the electrode 14. Note that the display panel described with reference to FIG. 21B differs from the display panel described with reference to FIG. 2B in that a conductive film capable of being formed in a step of forming the source electrode or the drain electrode of the transistor in the pixel circuit 530(*i*+1,j) is used for the electrode 14.

Structure Example 12 of Display Panel

Figure 22A:
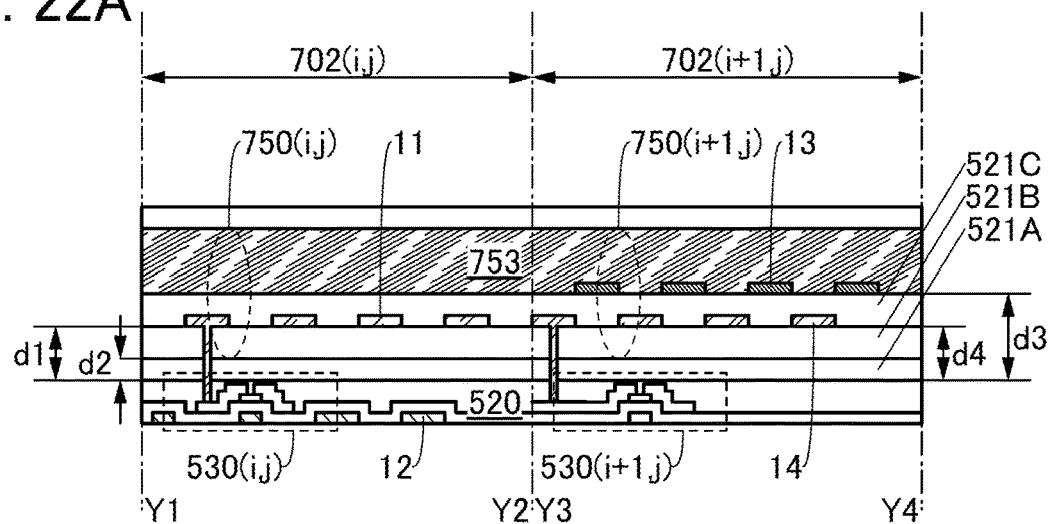
FIGS. 22A to 22C are cross-sectional views illustrating structures of a pixel of a display panel of an embodiment.
Figure 22B:
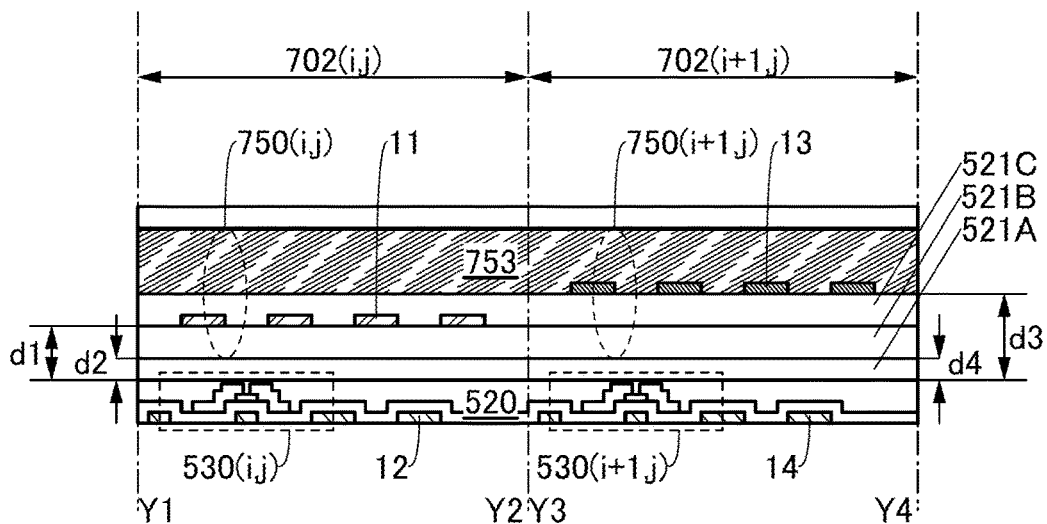
Figure 22C:
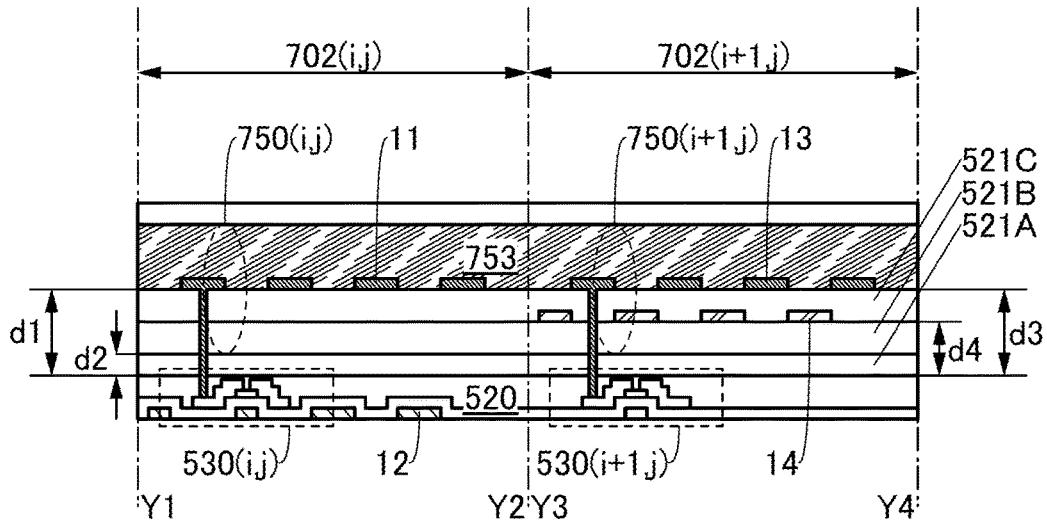

Display panels described with reference to FIGS. 22A to 22C differ from the display panels described with reference to FIGS. 21A to 21C in that a conductive film that can be formed in a step of forming the gate electrode of the transistor in the pixel circuit 530(*i,j*) is used for the electrode 12.

Note that this embodiment can be combined with any of the other embodiments in this specification as appropriate.

Embodiment 2

In this embodiment, structures of the display device of one embodiment of the present invention are described with reference to FIG. 11 and FIGS. 12A, 12B1, 12B2, and 12B3.

FIG. 11 is a block diagram illustrating a structure of the display device of one embodiment of the present invention.

Figure 12A:
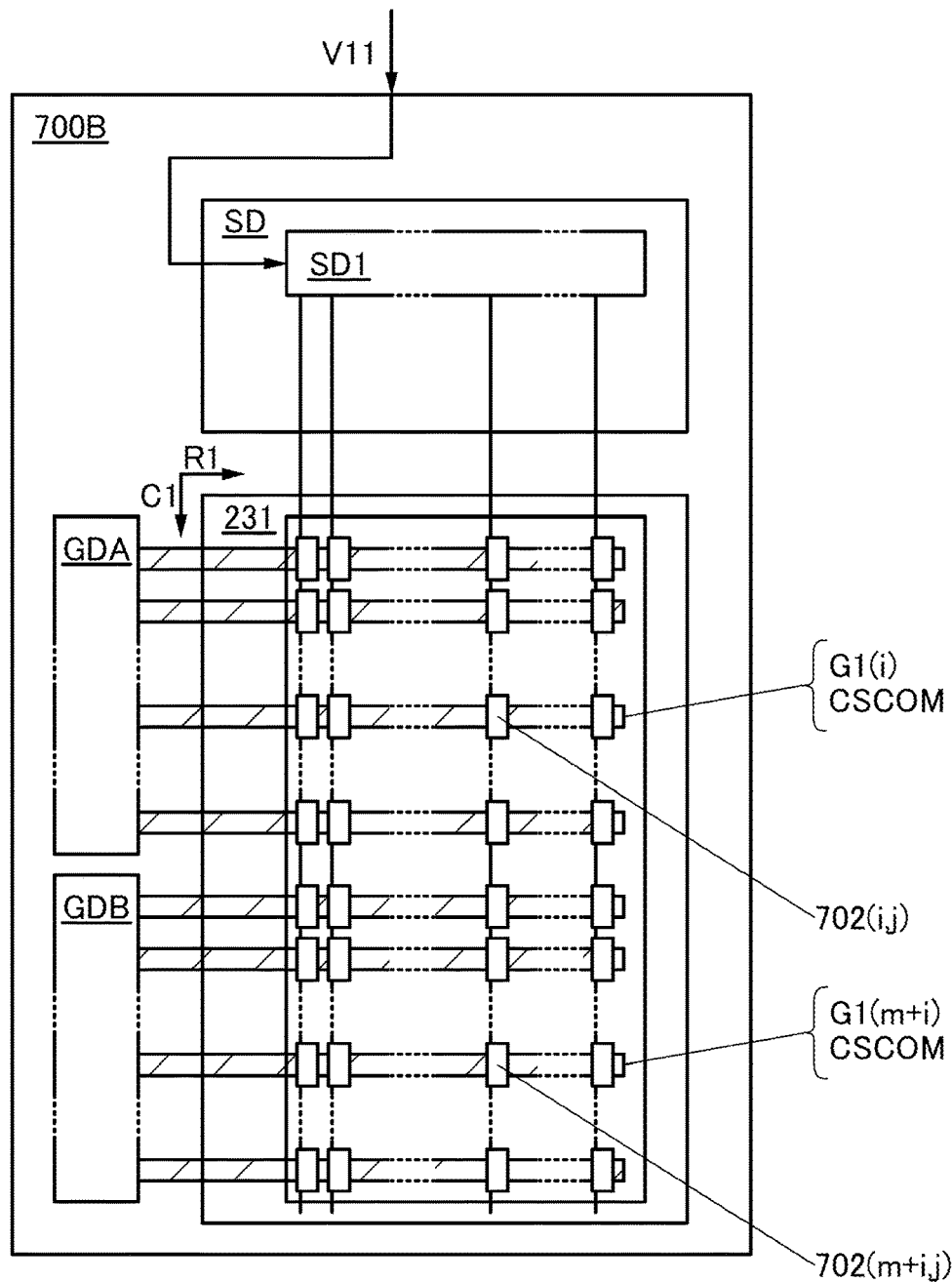
Figures 1, 12B:
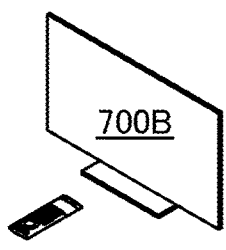
Figures 2, 12B:
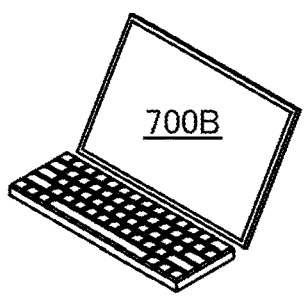
Figures 3, 12B:
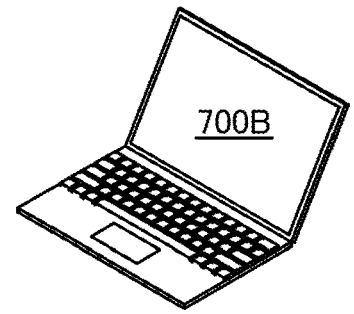

A structure of a display panel shown in FIG. 12A is different from that in FIG. 11. FIGS. 12B1 to 12B3 are external views of display devices of embodiments of the present invention.

Structure Example of Display Device

A display device described in this embodiment includes the display panel 700 and a control portion 238 (see FIG. 11). For example, the display panel described in Embodiment 1 can be used as the display panel 700. Alternatively, the display panel 700B can be used.

<<Control Portion 238>>

The control portion 238 has a function of receiving image data V1 and control data SS.

The control portion 238 has a function of generating the first data V11 on the basis of the image data V1. The control portion 238 has a function of supplying the first data V11.

For example, a decompression circuit 234 or an image processing circuit 235M can be used for the control portion 238.

<<Display Panel 700>>

The display panel 700 has a function of receiving the first data V11.

The display panel 700 has a function of displaying an image on the basis of the first data V11.

The display panel 700 includes the pixel 702($i,j$). The pixel 702($i,j$) includes the display element 750($i,j$). Specifically, a transmissive display element can be used as the display element 750($i,j$). Thus, image data can be displayed by controlling transmission of light supplied from the backlight 700BL on the basis of the first data V11.

Accordingly, image data can be displayed with the use of the display panel. Consequently, a novel display device that is highly convenient or reliable can be provided.

For example, a television receiver system (see FIG. 12B1), a video monitor (see FIG. 12B2), a laptop computer (see FIG. 12B3), or the like can be provided.

<<Decompression Circuit 234>>

The decompression circuit 234 has a function of decompressing the image data V1 which is supplied in a compressed state. The decompression circuit 234 includes a memory portion. The memory portion has a function of storing decompressed image data, for example.

<<Image Processing Circuit 235M>>

The image processing circuit 235M includes a region, for example.

The region has a function of storing data included in the image data V1, for example.

The image processing circuit 235M has a function of generating the data V11 by correcting the image data V1 on the basis of a predetermined characteristic curve and a function of supplying the data V11, for example. Specifically, the image processing circuit 235M has a function of generating the data V11 so that the display element 750($i,j$) can display a favorable image.

<<Backlight 700BL>>

The backlight 700BL has a function of emitting light to the display panel 700.

For example, a light-emitting diode, an organic EL element, or the like can be used for the backlight 700BL. Specifically, a light-emitting diode using quantum dots as a fluorescent material can be used. Accordingly, bright-color light with a narrow half width can be emitted.

For example, a minute lens can be provided between the backlight BL and the pixel 702($i,j$). Specifically, the lens can be used to condense light emitted from the backlight 700BL to the pixel 702($i,j$). Thus, light emitted from the backlight 700BL can be effectively used.

Note that this embodiment can be combined with any of the other embodiments in this specification as appropriate.

Embodiment 3

In this embodiment, a structure of an input/output device of one embodiment of the present invention is described with reference to FIG. 13.

Figure 13:
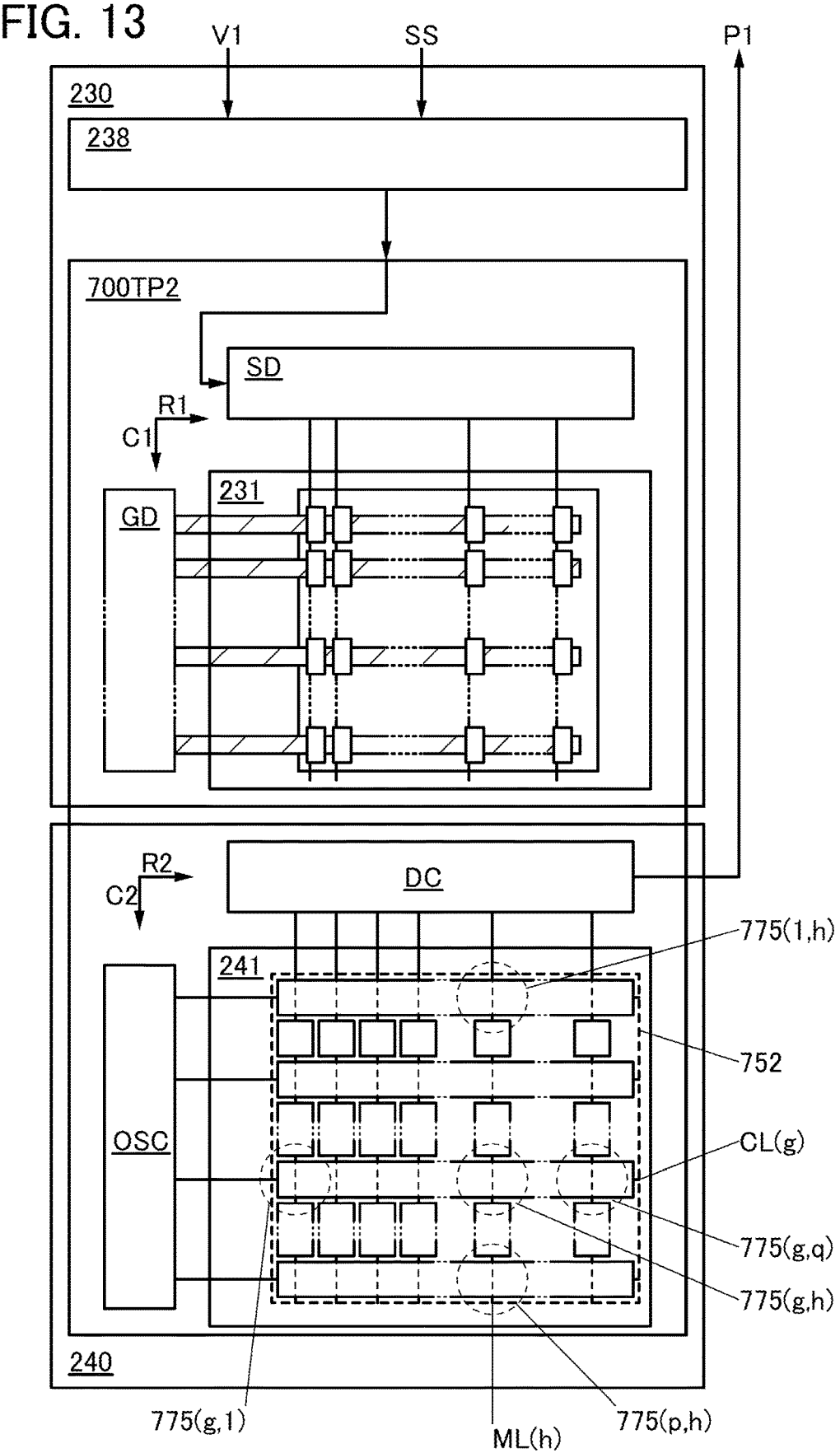
FIG. 13 is a block diagram illustrating a structure of an input/output device of an embodiment.

FIG. 13 is a block diagram illustrating the structure of the input/output device of one embodiment of the present invention.

Structure Example of Input/Output Device

The input/output device described in this embodiment includes an input portion 240 and a display portion 230 (see FIG. 13). For example, the display panel 700 described in Embodiment 1 can be used for the display portion 230.

The input portion 240 includes a sensing region 241. The input portion 240 has a function of sensing an object approaching the sensing region 241.

The sensing region 241 includes a region overlapping with the pixel 702($i,j$).

<<Input Portion 240>>

The input portion 240 includes the sensing region 241. The input portion 240 can include an oscillation circuit OSC and a sensing circuit DC (see FIG. 13).

<<Sensing Region 241>>

The sensing region 241 can include one or a plurality of sensing elements, for example.

The sensing region 241 includes one group of sensing elements 775($g,1$) to 775($g,q$) and another group of sensing elements 775($1,h$) to 775($p,h$) (see FIG. 13). Note that g is an integer greater than or equal to 1 and less than or equal to p, h is an integer greater than or equal to 1 and less than or equal to q, and each of p and q is an integer greater than or equal to 1.

The one group of sensing elements 775($g,1$) to 775($g,q$) include the sensing element 775($g,h$) and are arranged in a row direction (indicated by the arrow R2 in the drawing). Note that the direction indicated by the arrow R2 in FIG. 13 may be the same as or different from the direction indicated by the arrow R1 in FIG. 13.

The another group of sensing elements 775($1,h$) to 775($p,h$) include the sensing element 775($g,h$) and are arranged in the column direction (the direction indicated by the arrow C2 in the drawing) that intersects the row direction.

<<Sensing Element>>

The sensing element has a function of sensing an approaching pointer. For example, a finger, a stylus pen, or the like can be used for the pointer. For example, a piece of metal, a coil, or the like can be used for the stylus pen.

Specifically, a capacitive proximity sensor, an electromagnetic inductive proximity sensor, an optical proximity sensor, a resistive proximity sensor, or the like can be used as the sensing element.

Alternatively, a plurality of kinds of sensing elements can be used in combination. For example, a sensing element that senses a finger and a sensing element that senses a stylus pen can be used in combination. This allows determination of the kind of a pointer. Alternatively, an instruction can be associated with sensing data depending on the kind of a pointer. Specifically, in the case where it is determined that a finger is used as a pointer, sensing data can be associated with a gesture. In the case where it is determined that a stylus pen is used as a pointer, sensing data can be associated with drawing processing.

Specifically, a capacitive proximity sensor or an optical proximity sensor can be used to sense a finger. An electromagnetic inductive proximity sensor or an optical proximity sensor can be used to sense a stylus pen.

Note that this embodiment can be combined with any of the other embodiments in this specification as appropriate.

Embodiment 4

In this embodiment, a structure of an input/output panel of one embodiment of the present invention is described with reference to FIGS. 14A to 14C and FIGS. 15A and 15B.

Figure 14A:
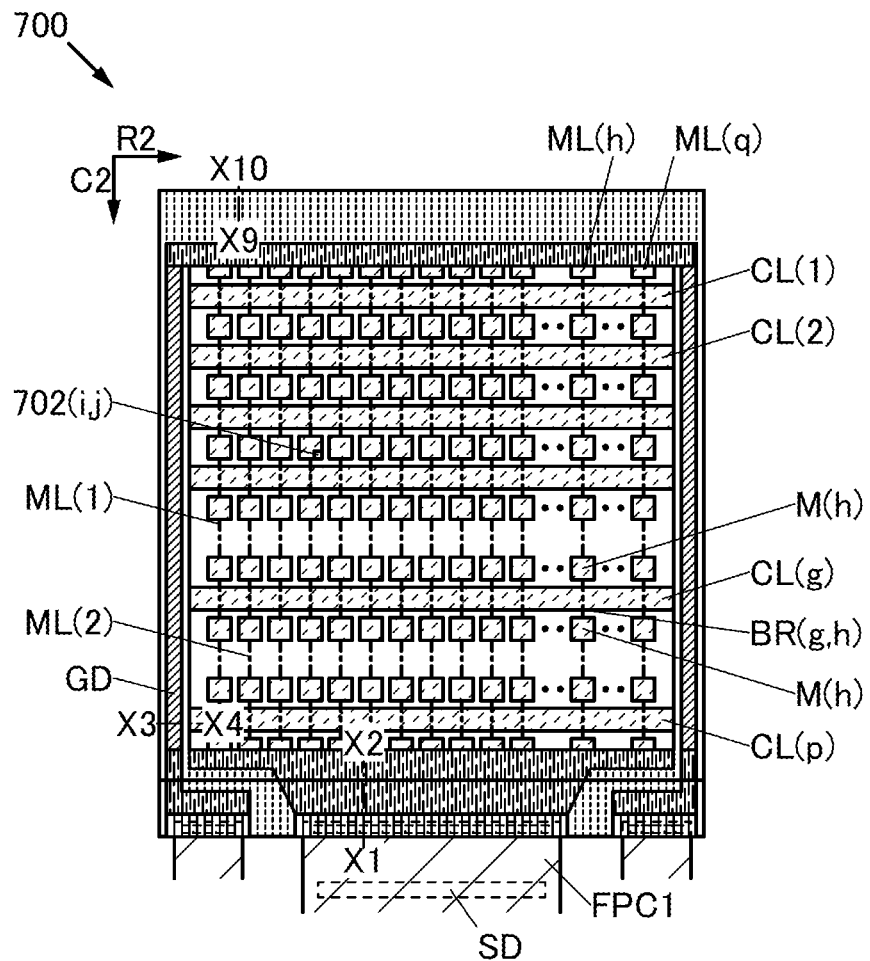
FIGS. 14A to 14C are a top view and projection views illustrating a structure of an input/output device of an embodiment.
Figure 14B:
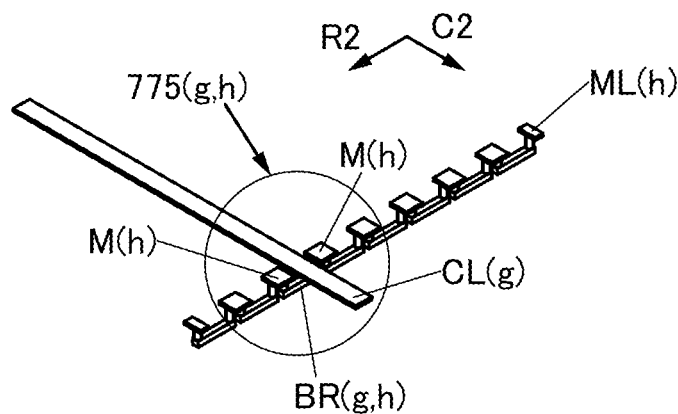
Figure 14C:
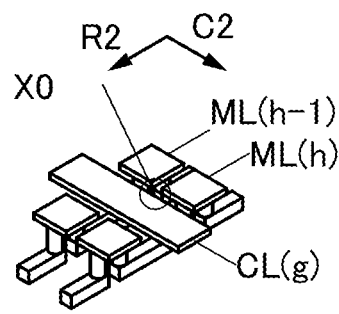

FIGS. 14A to 14C illustrate the structure of the input/output panel which can be used for the input/output device of one embodiment of the present invention. FIG. 14A is a top view of the input/output panel. FIGS. 14B and 14C are each a projection view illustrating part of FIG. 14A.

Figure 15A:
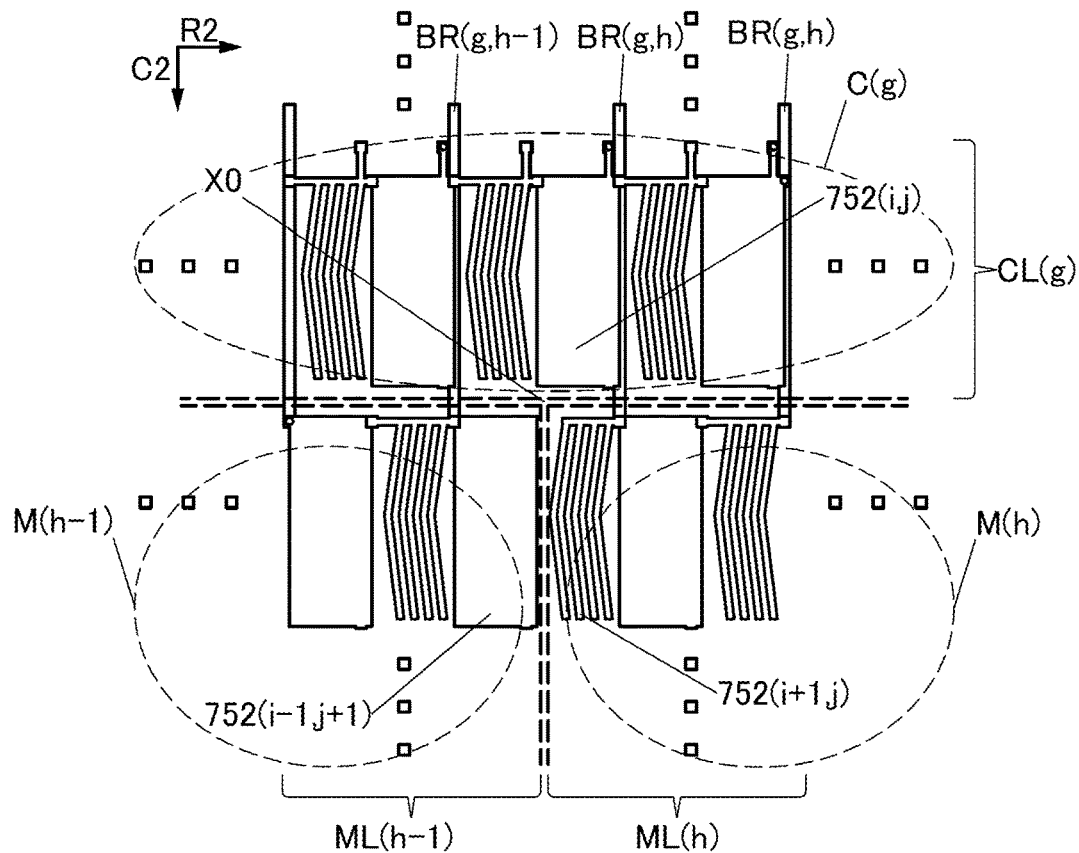
FIGS. 15A and 15B are a top view and a projection view illustrating a structure of an input/output device of an embodiment.
Figure 15B:
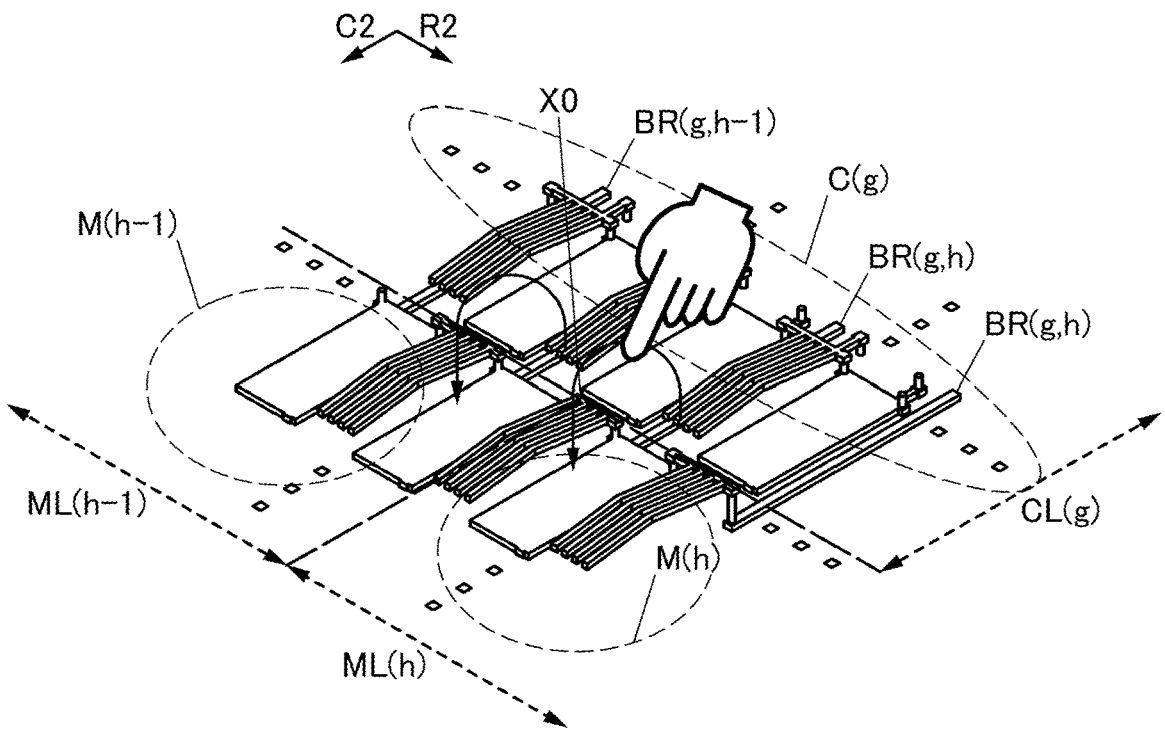

FIGS. 15A and 15B illustrate the structure of the input/output panel which can be used for the input/output device of one embodiment of the present invention. FIG. 15A is a top view of a portion in which a control line and a sensing signal line are adjacent to each other. FIG. 15B is a projection view that schematically illustrates an electric field generated in the portion where the control line and the sensing signal line are adjacent to each other.

Structure Example of Input/Output Panel

The input/output panel described in this embodiment differs from, for example, the display panel 700 described in Embodiment 1 in that the sensing region 241 is included. The different portion will be described in detail below, and the above description is referred to for similar portions.

<<Sensing Region 241>>

The sensing region 241 includes a control line CL(g), a sensing signal line ML(h), and the sensing element 775(g,h) (see FIG. 13).

The control line CL(g) has a function of supplying a control signal, and the sensing signal line ML(h) has a function of receiving a sensing signal.

<<Sensing Element 775(g,h)>>

The sensing element 775(g,h) is electrically connected to the control line CL(g) and the sensing signal line ML(h) (see FIG. 13 and FIGS. 14A and 14B).

The sensing element 775(g,h) has a function of supplying a sensing signal that varies in accordance with a control signal and a distance between a region overlapping with the pixel 702(i,j) and an object approaching the region (see FIG. 15B).

The sensing element 775(g,h) includes a control electrode C(g) and a sensing electrode M(h) (see FIG. 14B).

The control electrode C(g) is electrically connected to the control line CL(g), and the control electrode C(g) includes the first electrode 11 or the second electrode 12 that is not electrically connected to the pixel circuit 530(i,j) (see FIG. 15A). For example, a plurality of electrodes including the electrode 752(i,j) that is not electrically connected to the pixel circuit can be used for the control electrode C(g).

Specifically, a plurality of electrodes that are provided as electrodes of display elements in a plurality of pixels arranged in the row direction (the direction indicated by the arrow R2 in the drawing) but are not electrically connected to the pixel circuit are electrically connected to each other to form the control electrode C(g) or the control line CL(g) (see FIG. 15B).

The sensing electrode M(h) is electrically connected to the sensing signal line ML(h), and the sensing electrode M(h) includes the third electrode 13 or the fourth electrode 14 that is not electrically connected to the pixel circuit 530(i+1,j) (see FIG. 15A). For example, a plurality of electrodes including the electrode 752(i+1,j) that is not electrically connected to the pixel circuit can be used for the sensing electrode M(h).

Specifically, a plurality of electrodes that are provided as electrodes of display elements in a plurality of pixels arranged in the column direction (the direction indicated by the arrow C2 in the drawing) but are not electrically connected to the pixel circuit are electrically connected to each other to form the sensing electrode M(h) or the sensing signal line ML(h) (see FIG. 15B).

For example, in the plurality of electrodes that are not electrically connected to the pixel circuit, the electrode 752(i,j) that can be used for the control line CL(g), the electrode 752(i+1,j) that can be used for the sensing signal line ML(h), and the electrode 752(i−1,j+1) that can be used for the sensing signal line ML(h+1) are adjacent to each other in an adjacent portion X0 (see FIG. 15A).

The sensing electrode M(h) is located such that an electric field is generated between the sensing electrode M(h) and the control electrode CL(j), and part of the electric field is blocked by an object approaching the region overlapping with the pixel 702(i,j) (see FIG. 15B). For example, part of an electric field generated between the sensing electrode M(h) and the control electrode C(g) in the vicinity of the pixel 702(i,j) is blocked by an approaching finger or the like.

Thus, a plurality of electrodes that are provided in the sensing region but not electrically connected to the pixel circuit can be divided into a plurality of regions. Furthermore, different potentials can be supplied to the plurality of regions. Furthermore, the electrodes divided into the plurality of regions can be used for electrodes of the sensing elements. Furthermore, different potentials can be supplied to control lines. Furthermore, the sensing signal can be supplied to the sensing signal line. Furthermore, an in-cell input/output panel can be provided. Furthermore, components of an input/output panel can be reduced.

An object approaching the region overlapping with the display portion can be sensed while image data is displayed with the use of the display portion. Furthermore, a finger or the like that approaches the display portion can be used as a pointer to input positional data. Furthermore, positional data can be associated with image data displayed on the display portion. As a result, a novel input/output device that is highly convenient or reliable can be provided.

<<Oscillation Circuit OSC>>

The oscillation circuit OSC is electrically connected to the control line CL(g) and has a function of supplying a control signal. For example, a rectangular wave, a sawtooth wave, a triangular wave, or the like can be used as the control signal.

<<Sensing Circuit DC>>

The sensing circuit DC is electrically connected to the sensing signal line ML(h) and has a function of supplying a sensing signal on the basis of a change in the potential of the sensing signal line ML(h). Note that the sensing signal includes positional data P1, for example.

<<Display Portion 230>>

The display panel described in Embodiment 1 can be used for the display portion 230, for example. The display device described in Embodiment 2 can be used for the display portion 230.

<<Sensing Element 775(g,h)>>

The sensing element 775(g,h) includes the control electrode C(g) and the sensing signal line ML(h) (see FIG. 15A).

A conductive film having a light-transmitting property in a region overlapping with the pixel 702(i,j) or a conductive film having an opening in a region overlapping with the pixel 702(i,j) can be used for the control electrode C(g) or the sensing electrode M(h). Accordingly, an object that approaches the region overlapping with the display panel can be sensed while display of the display panel is not obstructed by the control electrode C(g) or the sensing electrode M(h).

The sensing region 241 includes the one group of sensing elements 775(g,1) to 775(g,q) and the another group of sensing elements 775(1,h) to 775(p,h) (see FIG. 14A). Note that g is an integer greater than or equal to 1 and less than or equal to p, h is an integer greater than or equal to 1 and less than or equal to q, and each of p and q is an integer greater than or equal to 1.

The one group of sensing elements 775(g,1) to 775(g,q) include the sensing element 775(g,h) and are arranged in the row direction (indicated by the arrow R2 in the drawing). Note that the direction indicated by the arrow R2 in FIG. 14A may be the same as or different from the direction indicated by the arrow R1 in FIG. 13.

The another group of sensing elements 775(1,h) to 775(p,h) include the sensing element 775(g,h) and are arranged in the column direction (the direction indicated by the arrow C2 in the drawing) that intersects the row direction.

The one group of sensing elements 775(g, 1) to 775(g,q) arranged in the row direction include the control electrode C(g) that is electrically connected to the control line CL(g). For example, a conductive film that is the same as the conductive film used for the control line CL(g) can be used for the control electrode C(g). Thus, the control line CL(g) can be integrated with the control electrode C(g).

The another group of sensing elements 775(1,h) to 775(p,h) arranged in the column direction include the sensing electrode M(h) that is electrically connected to the sensing signal line ML(h). For example, a conductive film that is the same as the conductive film used for the sensing signal line ML(h) can be used for the sensing electrode M(h). Thus, the sensing signal line ML(h) can be integrated with the sensing electrode M(h).

The sensing signal line ML(h) includes a conductive film BR(g,h) (see FIG. 14B or FIG. 15B). The conductive film BR(g,h) includes a region overlapping with the control line CL(g).

The sensing element 775(g,h) includes an insulating film. The insulating film includes a region positioned between the control line CL(g) and the conductive film BR(g,h). Thus, a short circuit between the control line CL(g) and the conductive film BR(g,h) can be prevented.

Note that this embodiment can be combined with any of the other embodiments in this specification as appropriate.

Embodiment 5

In this embodiment, the structure of a data processing device of one embodiment of the present invention will be described with reference to FIGS. 16A to 16C, FIGS. 17A and 17B, and FIGS. 18A and 18B.

Figure 16A:
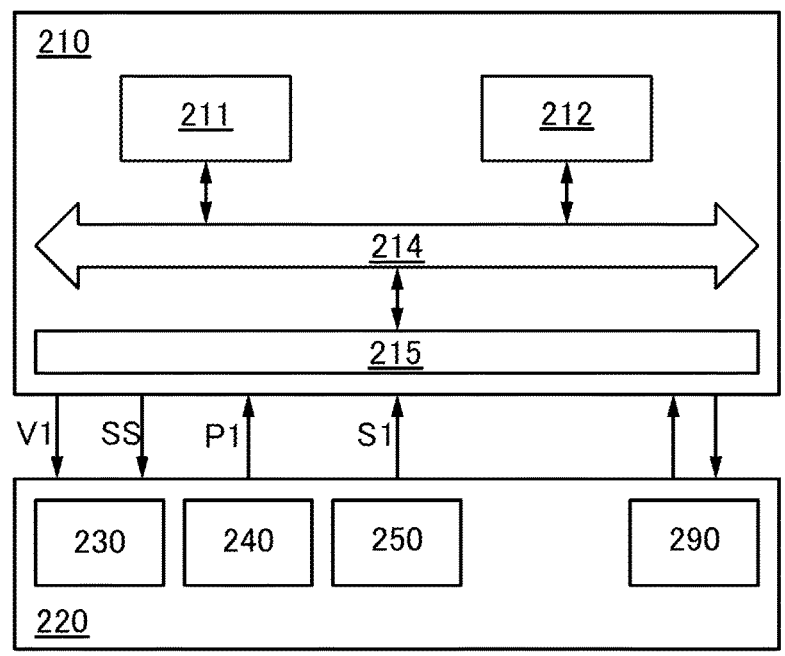
FIGS. 16A to 16C are a block diagram and projection views illustrating structures of a data processing device of an embodiment.
Figure 16B:
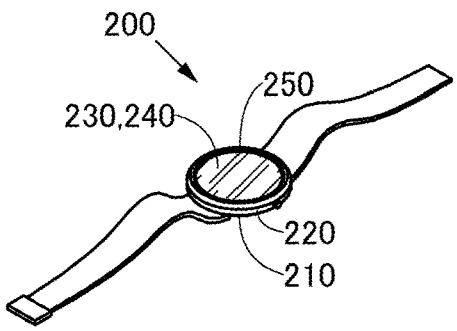
Figure 16C:
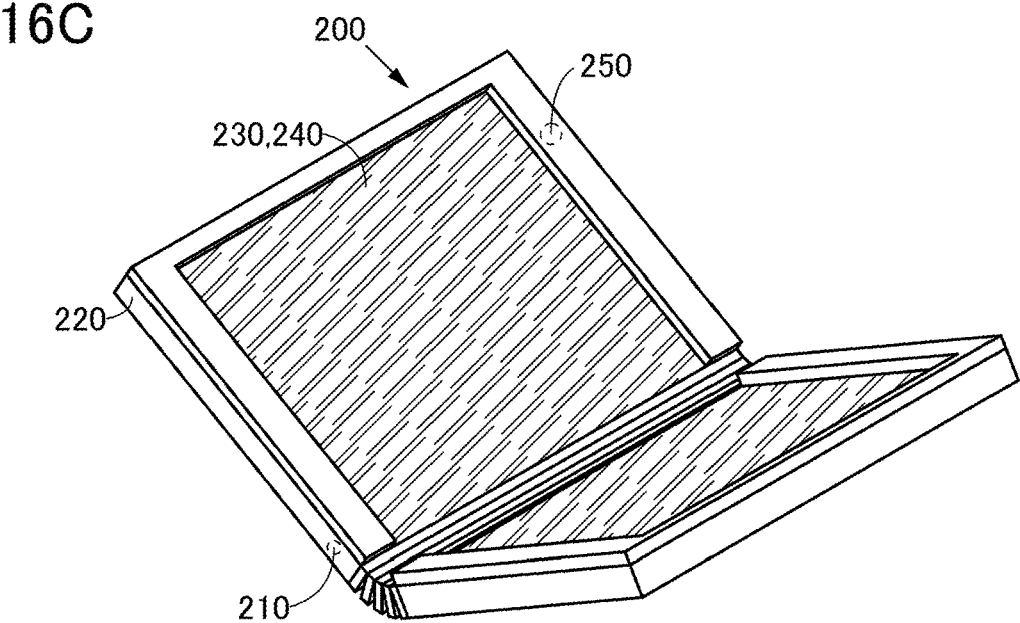

FIG. 16A is a block diagram illustrating the structure of the data processing device of one embodiment of the present invention. FIGS. 16B and 16C are projection views each illustrating an example of an external view of the data processing device 200.

Figure 17A:
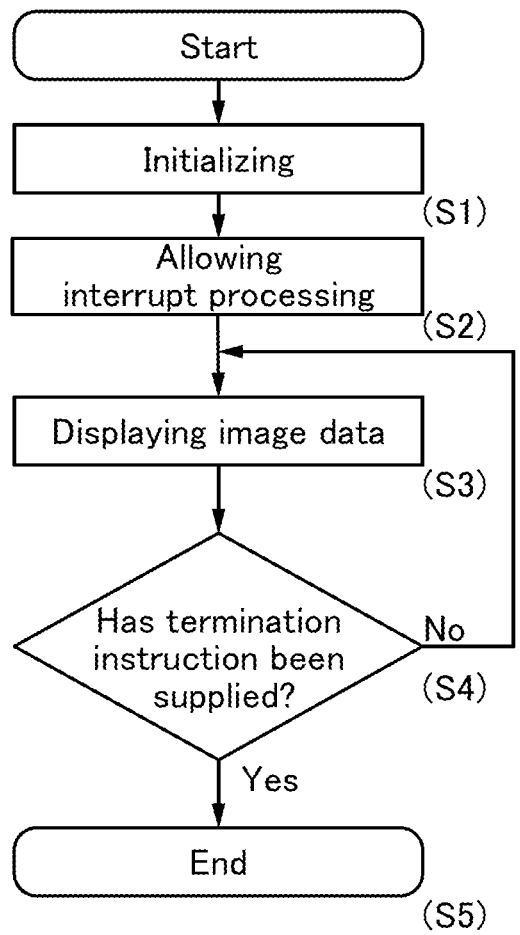
FIGS. 17A and 17B are flow charts illustrating a driving method of a data processing device of an embodiment.
Figure 17B:
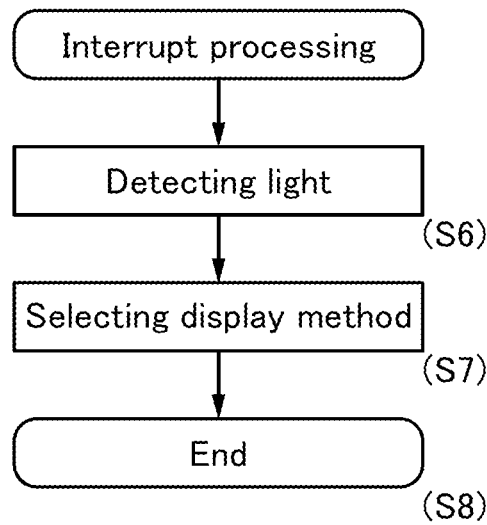

FIGS. 17A and 17B are flow charts showing a program of one embodiment of the present invention. FIG. 17A is a flow chart showing main processing of the program of one embodiment of the present invention. FIG. 17B is a flow chart showing interrupt processing.

Figure 18A:
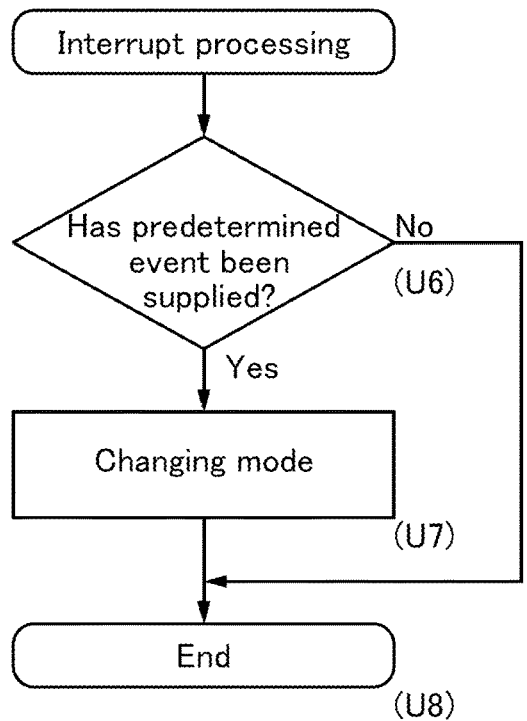
FIGS. 18A and 18B illustrate a driving method of a data processing device of an embodiment.
Figure 18B:
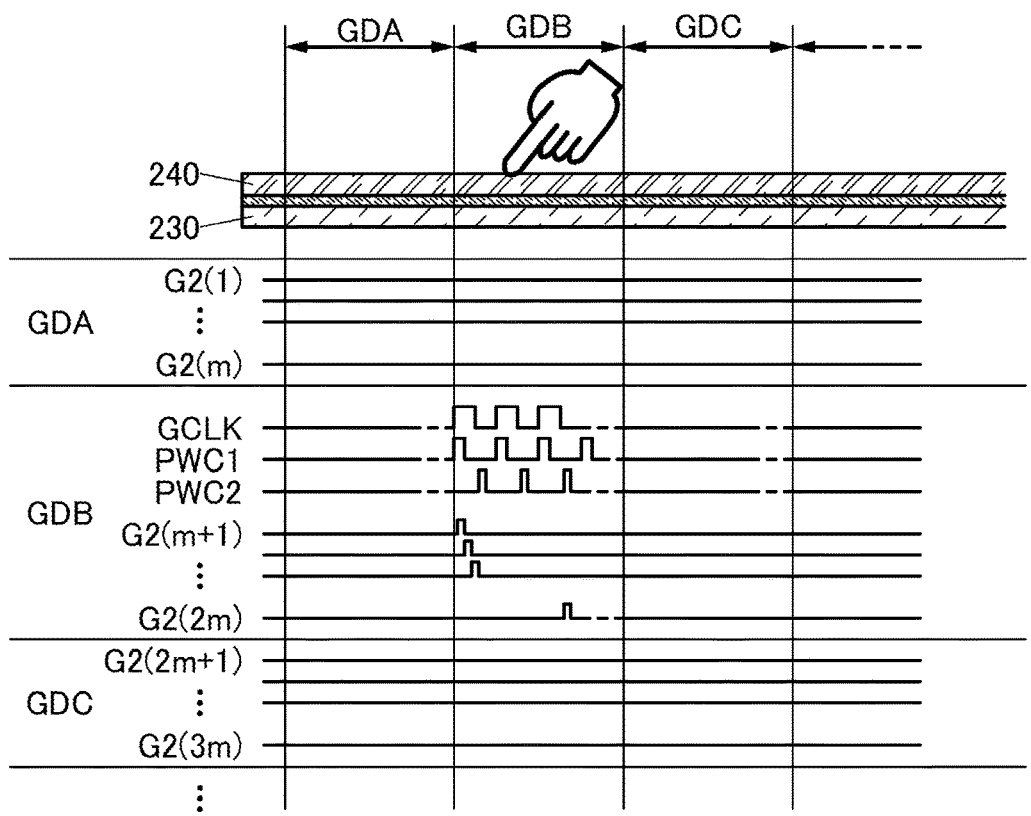

FIG. 18A is a flow chart showing interrupt processing of the program of one embodiment of the present invention. FIG. 18B is a schematic view illustrating the operation.

Structure Example 1 of Data Processing Device

The data processing device 200 described in this embodiment includes an input/output device 220 and an arithmetic device 210 (see FIG. 16A). The input/output device is electrically connected to the arithmetic device 210. Furthermore, the data processing device 200 can include a housing (see FIG. 16B or FIG. 16C).

The input/output device 220 includes the display portion 230 and the input portion 240 (see FIG. 16A). The input/output device 220 includes a sensing portion 250. The input/output device 220 can include a communication portion 290.

The input/output device 220 has a function of receiving the image data V1 or the control data SS and a function of supplying the positional data P1 or sensing data S1.

The arithmetic device 210 has a function of receiving the positional data P1 or the sensing data S1. The arithmetic device 210 has a function of supplying the image data V1. The arithmetic device 210 has a function of operating on the basis of the positional data P1 or the sensing data S1.

Note that the housing has a function of housing the input/output device 220 or the arithmetic device 210. Alternatively, the housing has a function of supporting the display portion 230 or the arithmetic device 210.

The display portion 230 has a function of displaying an image on the basis of the image data V1. The display portion 230 has a function of displaying an image on the basis of the control data SS.

The input portion 240 has a function of supplying the positional data P1.

The sensing portion 250 has a function of supplying the sensing data S1. The sensing portion 250 has a function of sensing the illuminance of the environment where the data processing device 200 is used and a function of supplying illuminance data, for example.

Thus, the data processing device can determine the intensity of light received by the housing of the data processing device and operate in a usage environment. Alternatively, a user of the data processing device can select a display method. Consequently, a novel data processing device that is highly convenient or reliable can be provided.

Individual components included in the data processing device will be described below. Note that these components cannot be clearly distinguished from each other and one component may also serve as another component or include part of another component. For example, a touch panel in which a touch sensor is provided to overlap with a display panel serves as an input portion as well as a display portion.

Structure Example

The data processing device 200 of one embodiment of the present invention includes a housing or the arithmetic device 210.

The arithmetic device 210 includes an arithmetic portion 211, a memory portion 212, a transmission path 214, and an input/output interface 215.

The data processing device of one embodiment of the present invention includes the input/output device 220.

The input/output device 220 includes the display portion 230, the input portion 240, the sensing portion 250, and the communication portion 290.

<<Data Processing Device>>

The data processing device of one embodiment of the present invention includes the arithmetic device 210 or the input/output device 220.

<<Arithmetic Device 210>>

The arithmetic device 210 includes the arithmetic portion 211 and the memory portion 212. The arithmetic device 210 also includes the transmission path 214 and the input/output interface 215.

<<Arithmetic Portion 211>>

The arithmetic portion 211 has a function of executing a program, for example.

<<Memory Portion 212>>

The memory portion 212 has a function of, for example, storing a program executed by the arithmetic portion 211, initial data, setting data, an image, or the like.

Specifically, a hard disk, a flash memory, a memory including a transistor including an oxide semiconductor, or the like can be used for the memory portion 212.

<<Input/Output Interface 215 and Transmission Path 214>>

The input/output interface 215 includes a terminal or a wiring and has a function of supplying and receiving data. The input/output interface 215 can be electrically connected to the transmission path 214 and the input/output device 220.

The transmission path 214 includes a wiring and has a function of supplying and receiving data. For example, the transmission path 214 can be electrically connected to the input/output interface 215. In addition, the transmission path 214 can be electrically connected to the arithmetic portion 211, the memory portion 212, or the input/output interface 215.

<<Input/Output Device 220>>

The input/output device 220 includes the display portion 230, the input portion 240, the sensing portion 250, or the communication portion 290. For example, the input/output device described in Embodiment 3 can be used. In that case, power consumption can be reduced.

<<Display Portion 230>>

The display portion 230 includes the control portion 238, the driver circuit GD, the driver circuit SD, and the display panel 700 (see FIG. 11). For example, the display device described in Embodiment 2 can be used for the display portion 230.

<<Input Portion 240>>

Any of a variety of human interfaces or the like can be used as the input portion 240 (see FIGS. 16A to 16C).

For example, a keyboard, a mouse, a touch sensor, a microphone, a camera, or the like can be used as the input portion 240. Note that a touch sensor having a region overlapping with the display portion 230 can be used. An input/output device that includes the display portion 230 and a touch sensor having a region overlapping with the display portion 230 can be referred to as a touch panel or a touch screen.

For example, a user can make various gestures (e.g., tap, drag, swipe, and pinch in) using his/her finger as a pointer on the touch panel.

The arithmetic device 210, for example, analyzes data on the position, track, or the like of the finger on the touch panel and determines that a specific gesture is supplied when the analysis results meet predetermined conditions. Therefore, the user can supply a certain operation instruction associated with a predetermined gesture by using the gesture.

For instance, the user can supply a "scrolling instruction" for changing a portion where image data is displayed by using a gesture of touching and moving his/her finger on the touch panel.

<<Sensing Portion 250>>

The sensing portion 250 has a function of sensing the ambient conditions and supplying the sensing data. Specifically, the sensing portion 250 can supply illuminance data, attitude data, pressure data, positional data, and the like.

For example, a photosensor, an attitude sensor, an acceleration sensor, a direction sensor, a global positioning system (GPS) signal receiving circuit, a pressure sensor, a temperature sensor, a humidity sensor, a camera, or the like can be used for the sensing portion 250.

<<Communication Portion 290>>

The communication portion 290 has a function of supplying and acquiring data to/from a network.

<<Program>>

The program of one embodiment of the present invention has the following steps (see FIG. 17A).

[First Step]

In a first step, setting is initialized (see S1 in FIG. 17A).

For example, predetermined image data which is to be displayed on start-up and data for determining a predetermined mode of displaying the image data and a predetermined method of displaying the image data are acquired from the memory portion 212. Specifically, still image data or moving image data can be used as the predetermined image data. Furthermore, a first mode or a second mode can be used as the predetermined mode.

[Second Step]

In a second step, interrupt processing is allowed (see S2 in FIG. 17A). Note that an arithmetic device allowed to execute the interrupt processing can perform the interrupt processing in parallel with the main processing. The arithmetic device which has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

[Third Step]

In a third step, image data is displayed in a predetermined mode or a predetermined display method selected in the first step or the interrupt processing (see S3 in FIG. 17A). Note that the predetermined mode identifies a mode for displaying the data, and the predetermined display method identifies a method for displaying image data. For example, the image data V1 or the data V11 can be used for data to be displayed.

For example, a method for displaying the image data V1 can be associated with the first mode. Another method for displaying the image data V1 can be associated with the second mode. Thus, a display method can be selected on the basis of the selected mode.

<<First Mode>>

Specifically, a method of supplying selection signals to a scan line at a frequency of 30 Hz or more, preferably 60 Hz or more, and performing display in accordance with the selection signals can be associated with the first mode.

For example, the supply of selection signals at a frequency of 30 Hz or more, preferably 60 Hz or more, can display a smooth moving image.

For example, an image is refreshed at a frequency of 30 Hz or more, preferably 60 Hz or more, so that an image smoothly following the user's operation can be displayed on the data processing device 200 the user operates.

<<Second Mode>>

Specifically, a method of supplying selection signals to a scan line at a frequency of less than 30 Hz, preferably less than 1 Hz, further preferably less than once a minute and performing display in accordance with the selection signals can be associated with the second mode.

The supply of selection signals at a frequency of less than 30 Hz, preferably less than 1 Hz, more preferably less than once a minute, can perform display with flickering reduced. Furthermore, power consumption can be reduced.

For example, when the data processing device 200 is used for a clock or watch, the display can be refreshed at a frequency of once a second, once a minute, or the like.

[Fourth Step]

In a fourth step, the next step is determined as follows: a fifth step is selected when a termination instruction has been supplied, whereas the third step is selected when the termination instruction has not been supplied (see S4 in FIG. 17A).

For example, the termination instruction supplied in the interrupt processing can be used to determine the next step.

[Fifth Step]

In the fifth step, the program terminates (see S5 in FIG. 17A).

<<Interrupt Processing>>

The interrupt processing includes sixth to eighth steps described below (see FIG. 17B).

[Sixth Step]

In the sixth step, the illuminance of the environment where the data processing device 200 is used can be sensed using the sensing portion 250, for example (see S6 in FIG. 17B). Note that the color temperature or chromaticity of ambient light can be sensed instead of the illuminance of the environment.

[Seventh Step]

In the seventh step, a display method is determined on the basis of the sensed illuminance data (see S7 in FIG. 17B). For example, a display method is determined such that the brightness of display is not too bright or too dark.

In the case where the color temperature or chromaticity of the ambient light is sensed in the sixth step, the color of display may be adjusted.

[Eighth Step]

In the eighth step, the interrupt processing terminates (see S8 in FIG. 17B).

Structure Example 2 of Data Processing Device

Another structure of the data processing device of one embodiment of the present invention will be described with reference to FIGS. 18A and 18B.

FIG. 18A is a flow chart showing a program of one embodiment of the present invention. The interrupt processing in the flow chart in FIG. 18A is different from that in FIG. 17B.

Note that the structure example 2 of the data processing device is different from the interrupt processing in FIG. 17B in that the interrupt processing includes a step in which a mode is changed on the basis of a supplied predetermined event. The different portion will be described in detail below, and the above description is referred to for similar portions.

<<Interrupt Processing>>

The interrupt processing includes sixth to eighth steps described below (see FIG. 18A).

[Sixth Step]

In the sixth step, the processing proceeds to the seventh step when a predetermined event has been supplied, whereas the processing proceeds to the eighth step when the predetermined event has not been supplied (see U6 in FIG. 18A). For example, whether the predetermined event is supplied in a predetermined period or not can be a branch condition. Specifically, the predetermined period can be longer than 0 seconds and shorter than or equal to 5 seconds, preferably shorter than or equal to 1 second, more preferably shorter than or equal to 0.5 seconds, still more preferably shorter than or equal to 0.1 seconds.

[Seventh Step]

In the seventh step, the mode is changed (see U7 in FIG. 18A). Specifically, the mode is changed from the first mode to the second mode, or the mode is changed from the second mode to the first mode.

For example, a display mode of part of a region in the display portion 230 can be changed. Specifically, in the display portion 230 including the driver circuit GDA, the driver circuit GDB, and a driver circuit GDC, a display mode of a region to which a selection signal is supplied from the driver circuit GDB can be changed (see FIG. 18B).

For example, when a predetermined event is supplied to the input portion 240 in the region to which a selection signal is supplied from the driver circuit GDB, a display mode of the region can be changed. Specifically, the frequency of the selection signal supplied from the driver circuit GDB can be changed. Thus, for example, display of the region to which a selection signal is supplied from the driver circuit GDB can be refreshed without operation of the driver circuits GDA and GDC. Furthermore, power consumed by the driver circuits can be reduced.

[Eighth Step]

In the eighth step, the interrupt processing terminates (see U8 in FIG. 18A). Note that in a period in which the main processing is executed, the interrupt processing may be repeatedly executed.

<<Predetermined Event>>

For example, the following events can be used: events supplied using a pointing device such as a mouse (e.g., "click" and "drag") and events supplied to a touch panel with a finger or the like used as a pointer (e.g., "tap", "drag", and "swipe").

For example, the position of a slide bar pointed by a pointer, the swipe speed, and the drag speed can be used as parameters assigned to an instruction associated with a predetermined event.

For example, data sensed by the sensing portion 250 is compared to a predetermined threshold value, and the compared results can be used for the event.

Specifically, a pressure sensor or the like in contact with a button or the like that can be pushed in a housing can be used as the sensing portion 250.

<<Instruction Associated with Predetermined Event>>

For example, the termination instruction can be associated with a predetermined event.

For example, "page-turning instruction" for switching displayed image data from one to another can be associated with a predetermined event. Note that a parameter for determining the page-turning speed or the like when the "page-turning instruction" is executed can be supplied using the predetermined event.

For example, "scroll instruction" for moving the display position of part of image data and displaying another part continuing from that part can be associated with a predetermined event. Note that a parameter for determining the moving speed of the display position, or the like, when the "scroll instruction" is executed can be supplied using the predetermined event.

For example, an instruction for setting the display method or an instruction for generating image data can be associated with a predetermined event. Note that a parameter for determining the brightness of a generated image can be associated with a predetermined event. Note that a parameter for determining the brightness of a generated image may be determined on the basis of ambient brightness sensed by the sensing portion 250.

For example, an instruction for acquiring data distributed via a push service using the communication portion 290 can be associated with a predetermined event.

Note that positional data sensed by the sensing portion 250 may be used for the determination of the presence or absence of a qualification for acquiring data. Specifically, it may be determined that there is a qualification for acquiring data when a user is in a predetermined class room, school, conference room, office, building, or the like. For example, educational materials can be fed from a classroom of a school or a university, so that the data processing device 200 can be used as a schoolbook or the like (see FIG. 16C). Alternatively, materials distributed from a conference room in, for example, a company can be received and used for a conference material.

Note that this embodiment can be combined with any of the other embodiments in this specification as appropriate.

Embodiment 6

In this embodiment, structures of a data processing device of one embodiment of the present invention will be described with reference to FIGS. 19A to 19E and FIGS. 20A to 20E.

Figure 19A:
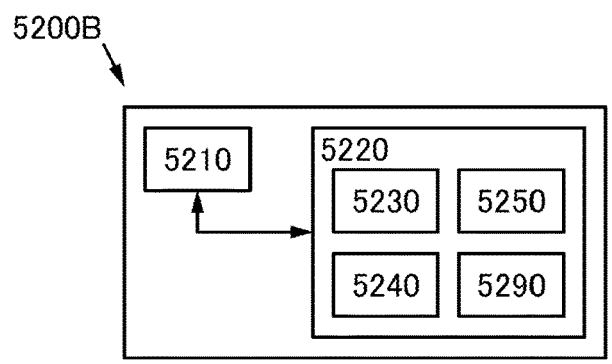
FIGS. 19A to 19E illustrate structures of a data processing device of an embodiment.

FIGS. 19A to 19E and FIGS. 20A to 20E illustrate structures of the data processing device of one embodiment of the present invention. FIG. 19A is a block diagram of the data processing device, and FIGS. 19B to 19E are perspective views each illustrating a structure of the data processing device. FIGS. 20A to 20E are perspective views each illustrating a structure of the data processing device.

<Data Processing Device>

A data processing device 5200B described in this embodiment includes an arithmetic device 5210 and an input/output device 5220 (see FIG. 19A).

The arithmetic device 5210 has a function of receiving operation data and a function of supplying image data on the basis of the operation data.

The input/output device 5220 includes a display portion 5230, an input portion 5240, a sensing portion 5250, and a communication portion 5290 and has a function of supplying operation data and a function of receiving image data. The input/output device 5220 also has a function of supplying sensing data, a function of supplying communication data, and a function of receiving communication data.

The input portion 5240 has a function of supplying operation data. For example, the input portion 5240 supplies operation data on the basis of operation by a user of the data processing device 5200B.

Specifically, a keyboard, a hardware button, a pointing device, a touch sensor, an audio input device, an eye-gaze input device, or the like can be used as the input portion 5240.

The display portion 5230 includes a display panel and has a function of displaying image data. For example, the display panel described in Embodiment 1 can be used for the display portion 5230.

The sensing portion 5250 has a function of supplying sensing data. For example, the sensing portion 5250 has a function of sensing a surrounding environment where the data processing device is used and supplying sensing data.

Specifically, an illuminance sensor, an imaging device, an attitude sensing device, a pressure sensor, a human motion sensor, or the like can be used as the sensing portion 5250.

The communication portion 5290 has a function of receiving and supplying communication data. For example, the communication portion 5290 has a function of being connected to another electronic device or a communication network through wireless communication or wired communication. Specifically, the communication portion 5290 has a function of wireless local area network communication, telephone communication, or near field communication, for example.

Structure Example 1 of Data Processing Device

Figure 19B:
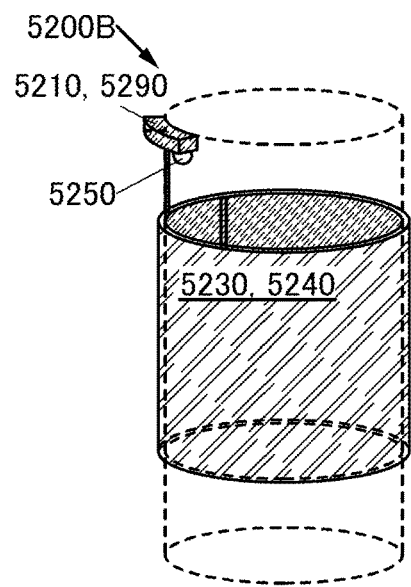

For example, the display portion 5230 can have an outer shape along a cylindrical column (see FIG. 19B). The data processing device 5200B has a function of changing the brightness of display in accordance with the illuminance of a usage environment. In addition, the data processing device 5200B has a function of changing the displayed content in response to sensed existence of a person. This allows the data processing device 5200B to be provided on a column of a building, for example. The data processing device 5200B can display advertising, guidance, or the like. The data processing device 5200B can be used for digital signage or the like.

Structure Example 2 of Data Processing Device

Figure 19C:
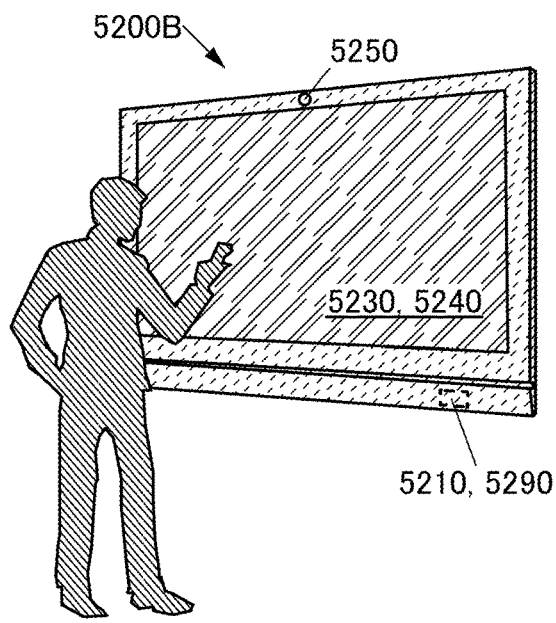

For example, the data processing device 5200B has a function of generating image data on the basis of the path of a pointer used by a user (see FIG. 19C). Specifically, the display panel with a diagonal size of 20 inches or longer, preferably 40 inches or longer, further preferably 55 inches or longer can be used. Alternatively, a plurality of display panels can be arranged in one display region. Alternatively, a plurality of display panels can be arranged and used for multiscreen. Thus, the data processing device 5200B can be used for an electronic blackboard, an electronic bulletin board, or digital signage, for example.

Structure Example 3 of Data Processing Device

Figure 19D:
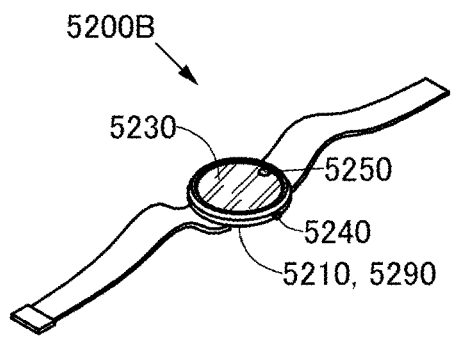

For example, the data processing device 5200B has a function of changing the brightness of display in accordance with the illuminance of a usage environment (see FIG. 19D). Thus, it is possible to obtain a smartwatch with reduced power consumption, for example. Alternatively, for example, it is possible to obtain a smartwatch that can display an image such that the smartwatch can be suitably used in an environment under strong external light, e.g., outdoors in fine weather.

Structure Example 4 of Data Processing Device

Figure 19E:
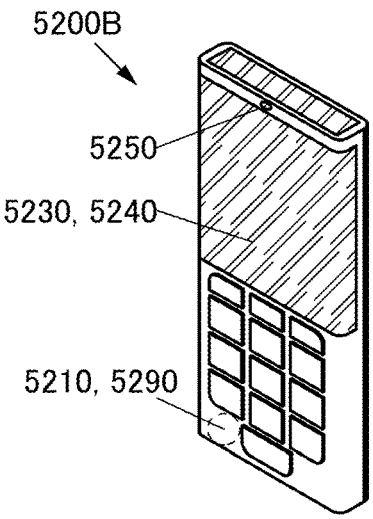

For example, the display portion 5230 has a surface gently curved along a side surface of a housing (see FIG. 19E). The display portion 5230 includes a display panel that can display an image on the front surface, the side surfaces, and the top surface, for example. Thus, it is possible to obtain a mobile phone that can display image data on not only its front surface but also its side surfaces and top surface.

Structure Example 5 of Data Processing Device

Figure 20A:
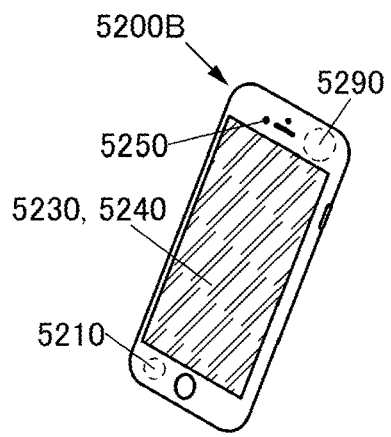
FIGS. 20A to 20E illustrate structures of a data processing device of an embodiment.

For example, the data processing device 5200B has a function of changing the brightness of display in accordance with the illuminance of a usage environment (see FIG. 20A). Thus, it is possible to obtain a smartphone with reduced power consumption, for example. Alternatively, for example, it is possible to obtain a smartphone that can display an image such that the smartwatch can be suitably used in an environment under strong external light, e.g., outdoors in fine weather.

Structure Example 6 of Data Processing Device

Figure 20B:
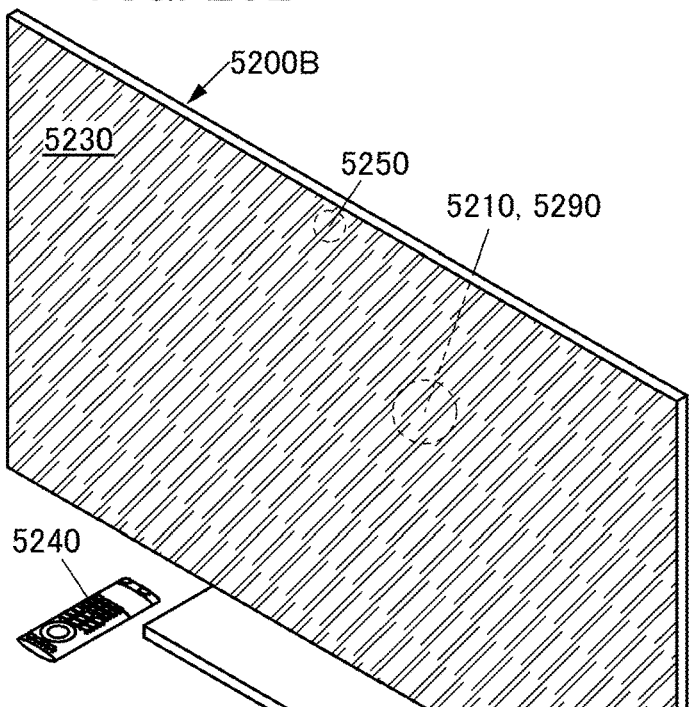

For example, the data processing device 5200B has a function of changing the brightness of display in accordance with the illuminance of a usage environment (see FIG. 20B). Accordingly, for example, it is possible to obtain a television system that can display an image such that the television system can be suitably used even when irradiated with strong external light that enters the room from the outside in fine weather.

Structure Example 7 of Data Processing Device

Figure 20C:
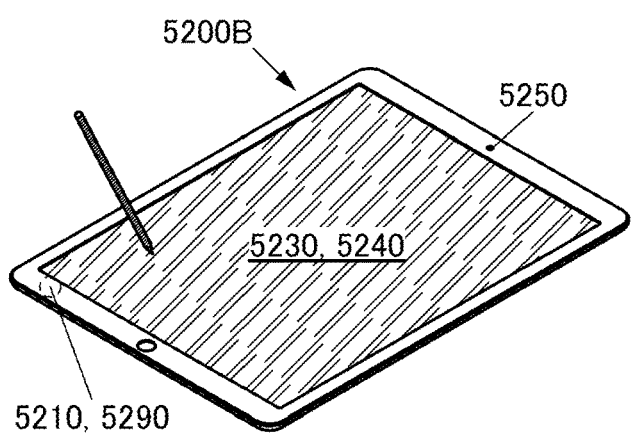

For example, the data processing device 5200B has a function of changing the brightness of display in accordance with the illuminance of a usage environment (see FIG. 20C). Thus, for example, it is possible to obtain a tablet computer that can display an image such that the tablet computer is favorably used even in an environment with intense external light, e.g., in the open air under fine weather.

Structure Example 8 of Data Processing Device

Figure 20D:
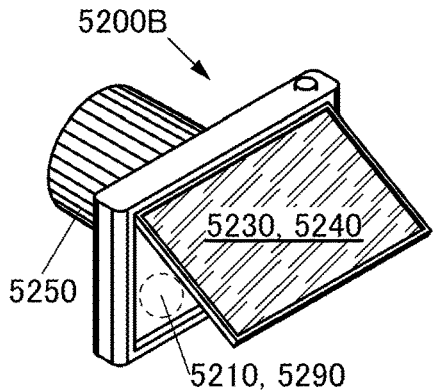

For example, the data processing device 5200B has a function of changing the brightness of display in accordance with the illuminance of a usage environment (see FIG. 20D). Accordingly, for example, it is possible to obtain a digital camera that can display a subject such that an image is favorably viewed even in an environment with intense external light, e.g., in the open air under fine weather.

Structure Example 9 of Data Processing Device

Figure 20E:
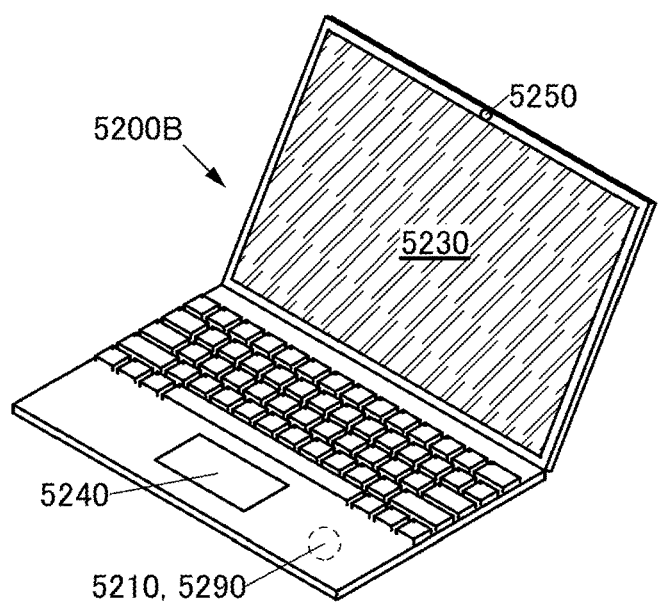

For example, the data processing device 5200B has a function of changing the brightness of display in accordance with the illuminance of a usage environment (see FIG. 20E). Accordingly, for example, it is possible to obtain a personal computer that can display an image such that the personal computer is favorably used even in an environment with intense external light, e.g., in the open air under fine weather.

Note that this embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that allow an electrical connection between X and Y (e.g., a switch, a transistor, a capacitor, an inductor, a resistor, a diode, a display element, a light-emitting element, and a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit: a signal converter circuit such as a D/A converter circuit, an A/D converter circuit, or a gamma correction circuit: a potential level converter circuit such as a power supply circuit (e.g., a step-up circuit or a step-down circuit) or a level shifter circuit for changing the potential level of a signal: a voltage source: a current source: a switching circuit: an amplifier circuit such as a circuit that can increase signal amplitude, the amount of current, or the like, an operational amplifier, a differential amplifier circuit, a source follower circuit, and a buffer circuit: a signal generation circuit: a memory circuit: or a control circuit) can be connected between X and Y. For example, even when another circuit is interposed between X and Y, X and Y are functionally connected when a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X through at least Z1 on a first connection path, the first connection path does not include a second connection path, the second connection path includes a connection path on which the transistor is present, a drain (or a second terminal or the like) of the transistor is electrically connected to Y through at least Z2 on a third connection path, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application Serial No. 2017-029967 filed with Japan Patent Office on Feb. 21, 2017, the entire contents of which are hereby incorporated by reference.

What is claimed is:

1. A display panel comprising:
a first transistor having a first semiconductor film and a second transistor over a substrate having a second semiconductor film;
a first insulating film over the first semiconductor film and the second semiconductor film;
a first conductive film over the first insulating film;
a second insulating film over the first conductive film;
a second conductive film and a third conductive film over the second insulating film;
a third insulating film over the third conductive film;
a fourth conductive film over the third insulating film; and
a layer over the fourth conductive film and the second conductive film, the layer containing a liquid crystal material,
wherein a first pixel comprises the first transistor,
wherein a second pixel comprises the second transistor,
wherein the second conductive film overlaps with the first conductive film,
wherein the first pixel and the second pixel are adjacent to each other,
wherein the fourth conductive film overlaps with the third conductive film,
wherein the second conductive film has a comb-like shape and is electrically connected to the first semiconductor film,
wherein the fourth conductive film has a comb-like shape, and
wherein the third conductive film is electrically connected to the second semiconductor film.

2. The display panel according to claim 1, wherein the second conductive film and the third conductive film are a same material.

3. A display device comprising:
the display panel according to claim 1; and
a control portion,
wherein the control portion is configured to receive image data and control data,
wherein the control portion is configured to generate first data on the basis of the image data,
wherein the control portion is configured to supply the first data, and
wherein the display panel is configured to display an image on the basis of the first data.

4. An input/output device comprising:
an input portion comprising a sensing region; and
a display portion comprising the display panel according to claim 1,
wherein the input portion is configured to sense an object approaching the sensing region, and
wherein the sensing region overlaps with the first pixel or the second pixel.

5. A display panel comprising:
a first transistor having a first semiconductor film and a second transistor over a substrate having a second semiconductor film;
a first insulating film over the first semiconductor film and the second semiconductor film;
a first conductive film over the first insulating film;
a second insulating film over the first conductive film;
a second conductive film and a third conductive film over the second insulating film;
a third insulating film over the third conductive film;
a fourth conductive film over the third insulating film; and a layer over the fourth conductive film and the second conductive film, the layer containing a liquid crystal material, wherein a first pixel comprises the first transistor, wherein a second pixel comprises the second transistor, wherein the second conductive film overlaps with the first conductive film, wherein the first pixel and the second pixel are adjacent to each other, wherein the fourth conductive film overlaps with the third conductive film, wherein the second conductive film has a comb-like shape and is electrically connected to the first semiconductor film, wherein the fourth conductive film has a comb-like shape, wherein the third conductive film is electrically connected to the second semiconductor film, wherein the second insulating film includes a fourth insulating film and a fifth insulating film, and wherein the fifth insulating film includes silicon and oxygen, and is thinner than the fourth insulating film.

6. The display panel according to claim 5, wherein the second conductive film and the third conductive film are a same material.

7. A display device comprising:

the display panel according to claim 5; and a control portion, wherein the control portion is configured to receive image data and control data, wherein the control portion is configured to generate first data on the basis of the image data, wherein the control portion is configured to supply the first data, and wherein the display panel is configured to display an image on the basis of the first data.

8. An input/output device comprising:

an input portion comprising a sensing region; and a display portion comprising the display panel according to claim 5, wherein the input portion is configured to sense an object approaching the sensing region, and wherein the sensing region overlaps with the first pixel or the second pixel.

9. A display panel comprising:

a first transistor having a first semiconductor film and a second transistor over a substrate having a second semiconductor film;

a first insulating film over the first semiconductor film and the second semiconductor film;

a first conductive film over the first insulating film;

a second insulating film over the first conductive film;

a second conductive film and a third conductive film over the second insulating film;

a third insulating film over the third conductive film;

a fourth conductive film over the third insulating film; and a layer over the fourth conductive film and the second conductive film, the layer containing a liquid crystal material, wherein a first pixel comprises the first transistor, wherein a second pixel comprises the second transistor, wherein the second conductive film overlaps with the first conductive film, wherein the first pixel and the second pixel are adjacent to each other, wherein the fourth conductive film overlaps with the third conductive film, wherein the second conductive film has a comb-like shape and is electrically connected to the first semiconductor film, wherein the fourth conductive film has a comb-like shape, wherein the third conductive film is electrically connected to the second semiconductor film, and wherein the layer is in contact with the second conductive film and the fourth conductive film.

10. The display panel according to claim 9, wherein the second conductive film and the third conductive film are a same material.

11. A display device comprising:

the display panel according to claim 9; and a control portion, wherein the control portion is configured to receive image data and control data, wherein the control portion is configured to generate first data on the basis of the image data, wherein the control portion is configured to supply the first data, and wherein the display panel is configured to display an image on the basis of the first data.

12. An input/output device comprising:

an input portion comprising a sensing region; and a display portion comprising the display panel according to claim 9, wherein the input portion is configured to sense an object approaching the sensing region, and wherein the sensing region overlaps with the first pixel or the second pixel.

* * * * *